US009703548B2

(12) United States Patent
Ledbrook

(10) Patent No.: US 9,703,548 B2
(45) Date of Patent: Jul. 11, 2017

(54) APPLICATION SERVER AND COMPUTER READABLE STORAGE MEDIUM FOR GENERATING PROJECT SPECIFIC CONFIGURATION DATA

(71) Applicant: THE LOUVIN GROUP PTY LTD, New South Wales (AU)

(72) Inventor: Louise Ledbrook, New South Wales (AU)

(73) Assignee: THE LOUVIN GROUP PTY LTD., New South Wales (AU)

( * ) Notice: Subject to any disclaimer, the term of this patent is extended or adjusted under 35 U.S.C. 154(b) by 0 days.

(21) Appl. No.: 14/648,523

(22) PCT Filed: Nov. 21, 2013

(86) PCT No.: PCT/AU2013/001336
§ 371 (c)(1),
(2) Date: May 29, 2015

(87) PCT Pub. No.: WO2014/082117
PCT Pub. Date: Jun. 5, 2014

(65) Prior Publication Data
US 2015/0324190 A1 Nov. 12, 2015

(30) Foreign Application Priority Data

Nov. 30, 2012 (AU) ................................ 2012905220

(51) Int. Cl.
*G06F 9/44* (2006.01)
*G06F 17/30* (2006.01)
*G06Q 10/06* (2012.01)

(52) U.S. Cl.
CPC .......... *G06F 8/70* (2013.01); *G06F 17/30312* (2013.01); *G06F 17/30598* (2013.01); *G06F 17/30654* (2013.01); *G06Q 10/0631* (2013.01)

(58) Field of Classification Search
CPC ................. G06F 8/70; G06F 17/30312; G06F 17/30598; G06F 17/30654; G06F 9/542;
(Continued)

(56) References Cited

U.S. PATENT DOCUMENTS 6,615,166 B1 * 9/2003 Guheen .................. G06Q 10/06 703/26
8,595,103 B1 * 11/2013 Wargin .................. G06Q 10/06 705/35

FOREIGN PATENT DOCUMENTS

WO 0171625 9/2001
WO WO 0171625 A2 * 9/2001 ............. G06Q 10/04
(Continued)

OTHER PUBLICATIONS

International Search Report for PCT/AU2013/001336, Completed by the Australian Patent Office on Mar. 4, 2014, 5 Pages.*

*Primary Examiner* — Mohammed Huda
(74) *Attorney, Agent, or Firm* — Brooks Kushman P.C.

(57) ABSTRACT

An application server for generating project specific configuration data, the application server having a processor, a memory device coupled to the processor for storing digital data and an interface coupled to the processor for sending and receiving data across a data network. The processor is adapted to receive and store project template data, receive and store question configuration data representing at least one question and at least one associated candidate answer and receive and store rule data representing a rule relating the project template data and the question configuration data. The processor being further adapted to send question data from the question configuration data and receive, answer data in response to the question data and generate project specific configuration data from the project template data based on the answer data and rule data.

34 Claims, 26 Drawing Sheets

(58) Field of Classification Search
CPC ... G06Q 10/04; G06Q 10/06; G06Q 10/06313
USPC .......................................................... 717/101
See application file for complete search history.

(56) References Cited

FOREIGN PATENT DOCUMENTS

| WO | 2009009623 | | 1/2009 | |
|---|---|---|---|---|
| WO | WO 2009009623 A1 | * | 1/2009 | ............. G06F 9/542 |

* cited by examiner

APPLICATION SERVER AND COMPUTER READABLE STORAGE MEDIUM FOR GENERATING PROJECT SPECIFIC CONFIGURATION DATA

CROSS-REFERENCE TO RELATED APPLICATION

This application is the U.S. national phase of PCT Application No. PCT/AU2013/001336 filed on Nov. 21, 2013, which claims priority to AU Patent Application No. 2012905220 filed on Nov. 30, 2012, the disclosures of which are incorporated in their entirety by reference herein.

FIELD OF THE INVENTION

The present invention relates to expert systems and in particular to an application server and computer readable storage medium for generating project specific configuration data.

The invention has been developed primarily for use in project management and will be described hereinafter with reference to this application. However, it will be appreciated that the invention is not limited to this particular field of use.

BACKGROUND

Existing project management systems provide project management capabilities for end users.

However, existing project management systems suffer from several disadvantages including limiting users to generic project content which may not be suited for specific projects. As such, users are therefore required to engage in significant customisation the project content including content creation, analysis and manipulation.

It is to be understood that, if any prior art information is referred to herein, such reference does not constitute an admission that the information forms part of the common general knowledge in the art, in Australia or any other country.

SUMMARY

The invention seeks to provide application server and computer readable storage medium for generating project specific configuration data which will overcome or substantially ameliorate at least some of the deficiencies of the prior art, or to at least provide an alternative.

According to one aspect, there is provided an application server for generating project specific configuration data, the application server comprising a processor for processing digital data; a memory device for storing digital data including computer program code, the memory device being coupled to the processor; a data interface for sending and receiving data across a data network, the data interface being coupled to the processor, a database connection for storing and retrieving digital data including project template data representing at least one project template, wherein the processor is controlled by the computer program code to: receive, via the data interface, the project template data; store, using the database connection, the project template data; receive, via the data interface, question configuration data representing at least one question and at least one associated candidate answer; store, using the database connection, the question configuration data; receive, via the data interface, rule data representing a rule relating the project template data and the question configuration data; store, using the database connection, the rule data; send, via the data interface, question data from the question configuration data; receive, via the data interface, answer data in response to the question data; and generate project specific configuration data from the project template data in accordance with the answer data and the rule data.

Advantageously, the application server allows end users to generate project specific configuration data in accordance with project specific requirements and different project types. Furthermore, the application server is adapted to allow the end user to specify the project specific requirements and the like using an intuitive question and answer "wizard" process.

Preferably, the project template data comprises project category data representing at least one project category and wherein the processor is further controlled by the computer program code to store, in the database, the project template data in relation to the project category data.

Advantageously, the application server is adapted to manage the project template data in accordance with project type.

Preferably, the at least one project category comprises at least one of module, parent project type, project type and sub type categories.

Preferably, the project template data comprises project task template data representing at least one project task template and wherein, in generating the project specific configuration data, the processor is further controlled by the computer program code to generate project task data representing at least one project task in accordance with the project task template data.

Preferably, the project task template data comprises deadline data representing at least one deadline for the completion of the at least one project task.

Advantageously, the application server is adapted for managing tasks in relation to a project.

Preferably, the project task template data comprises role data representing at least one role responsible for the completion of the at least one project task.

Advantageously, the application server is adapted for managing the assignment of the at least one project task to a particular role.

Preferably, the project template data comprises risk template data representing at least one risk template.

Preferably, the risk template data comprises responsible role data representing a role responsible for managing a risk.

Advantageously, the application server is adapted for managing the risks in relation to a project and also responsible roles for each risk.

Preferably, the project template data comprises role template data representing at least one role, and wherein, in generating the project task data, the processor is further controlled by the computer program code to generate responsibility data representing at least one responsibility for the at least one role in accordance with the role template data and the project task template data.

Preferably, the project template data comprises responsibility type data representing at least one responsibility type and wherein, in generating the responsibility data, the processor is further controlled by the computer program code to assign a type to the at least one responsibility.

Preferably, the at least one responsibility type comprises at least one of responsible, accountable, consulted and informed types.

Advantageously, the application server is adapted for managing differing responsibility types for differing roles.

Preferably, the responsibility type data is a matrix.

Preferably, the project template data comprises filesystem directory structure data representing a directory structure and wherein the processor is further controlled by the computer program code to structure a directory in accordance with the filesystem directory structure data.

Advantageously, the application server is adapted for generating a project specific file system directory structure.

Preferably, the filesystem directory structure data comprises template data representing a template for inclusion in a specified directory and wherein the processor, in generating the project specific configuration data, is further controlled by the computer program code to store, in the specified directory the template data.

Advantageously, the application server is adapted for generating project specific template data which may comprise knowledge and insights in relation to a particular project type.

Preferably, the template data comprises file data.

Preferably, the project template data comprises reminder template data representing at least one reminder and wherein the processor, in generating the project specific configuration data, is further controlled by the computer program code to generate reminded data representing at least one reminder in accordance with the reminder template data.

Preferably, the processor is further controlled by the computer program code to associate at least one rule with the at least one associated candidate answer.

According to another aspect, there is provided a computer readable storage medium for generating project specific configuration data, the computer readable storage medium comprising computer code instructions executable by a computer and comprising instructions for receiving, via a data interface, the project template data; storing, using a database connection, the project template data; receiving, via the data interface, question configuration data representing at least one question and at least one associated candidate answer; storing, using the database connection, the question configuration data; receiving, via the data interface, rule data representing a rule relating the project template data and the question configuration data; storing, using the database connection, the rule data; sending, via the data interface, question data from the question configuration data; receiving, via the data interface, answer data in response to the question data; and generating project specific configuration data from the project template data in accordance with the answer data and the rule data.

Preferably, the project template data comprises project category data representing at least one project category and further comprising instructions for storing, in the database, the project template data in relation to the project category data.

Preferably, the at least one project category comprises at least one of module, parent project type, project type and sub type categories.

Preferably, the project template data comprises project task template data representing at least one project task template and further comprising instructions for generating project task data representing at least one project task in accordance with the project task template data.

Preferably, the project task template data comprises deadline data representing at least one deadline for the completion of the at least one project task.

Preferably, the project task template data comprises role data representing at least one role responsible for the completion of the at least one project tasks.

Preferably, the project template data comprises risk template data representing at least one risk template.

Preferably, the risk template data comprises responsible role data representing a role responsible for managing a risk.

Preferably, the project template data comprises role template data representing at least one role, and further comprising instructions for generating responsibility data representing at least one responsibility for the at least one role in accordance with the role template data and the project task template data.

Preferably, the project template data comprises responsibility type data representing at least one responsibility type and further comprising instructions for assigning a type to the at least one responsibility.

Preferably, the at least one responsibility type comprises at least one of responsible, accountable, consulted and informed types.

Preferably, the responsibility type data is a matrix.

Preferably, the project template data comprises filesystem directory structure data representing a directory structure and further comprising instructions for structuring a directory in accordance with the filesystem directory structure data.

Preferably, the filesystem directory structure data comprises template data representing a template for inclusion in a specified directory and further comprising instructions for storing, in the specified directory the template data.

Preferably, the template data comprises file data.

Preferably, the project template data comprises reminder template data representing at least one reminder and further comprising instructions for generating reminded data representing at least one reminder in accordance with the reminder template data.

Preferably, the computer readable storage medium further comprises instructions for associating at least one rule with the at least one associated candidate answer;

Other aspects of the invention are also disclosed.

BRIEF DESCRIPTION OF THE DRAWINGS

Notwithstanding any other forms which may fall within the scope of the present invention, preferred embodiments of the invention will now be described, by way of example only, with reference to the accompanying drawings in which:

FIGS. 5 to 26 show exemplary graphical user interfaces adapted for generating project specific configuration data in accordance with other embodiments of the present invention.

DESCRIPTION OF EMBODIMENTS

Figure 1:
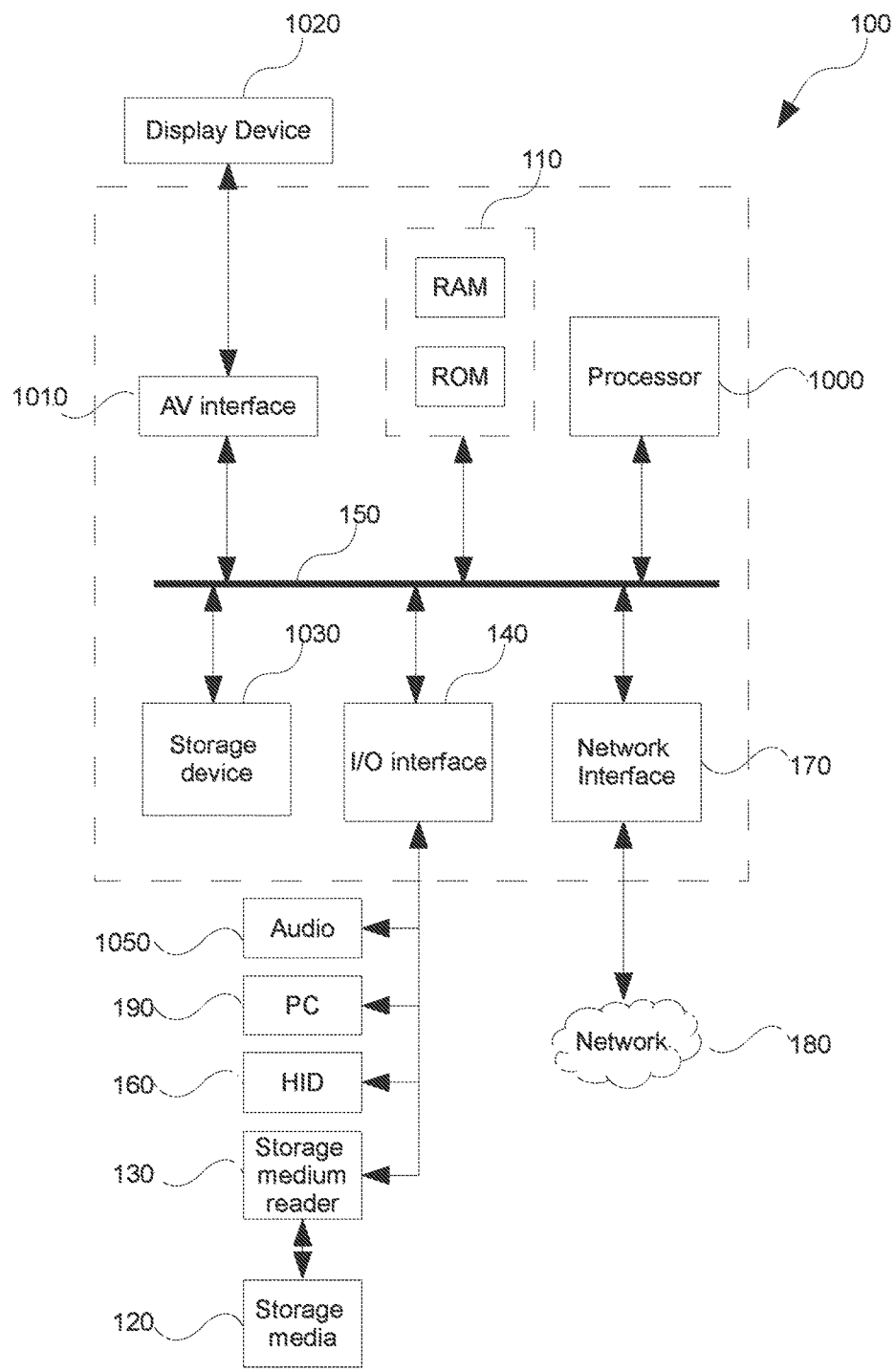
FIG. 1 shows a computing device on which the various embodiments described herein may be implemented in accordance with an embodiment of the present invention.

It should be noted in the following description that like or the same reference numerals in different embodiments denote the same or similar features.

Computing Device

FIG. 1 shows a computing device 100 on which the various embodiments described herein may be implemented. In a preferred embodiment, the computing device 100 takes the form of an application server 210 (such as a Web server) as substantially described in further detail below.

In particular the steps of the method of generating project specific configuration data may be implemented as computer program code instructions executable by the computing device 100. The computer program code instructions may be divided into one or more computer program code instruction libraries, such as dynamic link libraries (DLL), wherein each of the libraries performs a one or more steps of the method. Additionally, a subset of the one or more of the libraries may perform graphical user interface tasks relating to the steps of the method.

The device 100 comprises semiconductor memory 110 comprising volatile memory such as random access memory (RAM) or read only memory (ROM). The memory 100 may comprise either RAM or ROM or a combination of RAM and ROM.

The device 100 comprises a computer program code storage medium reader 130 for reading the computer program code instructions from computer program code storage media 120. The storage media 120 may be optical media such as CD-ROM disks, magnetic media such as floppy disks and tape cassettes or flash media such as USB memory sticks.

The device further comprises I/O interface 140 for communicating with one or more peripheral devices. The I/O interface 140 may offer both serial and parallel interface connectivity. For example, the I/O interface 140 may comprise a Small Computer System Interface (SCSI), Universal Serial Bus (USB) or similar I/O interface for interfacing with the storage medium reader 130. The I/O interface 140 may also communicate with one or more human input devices (HID) 160 such as keyboards, pointing devices, joysticks and the like. The I/O interface 140 may also comprise a computer to computer interface, such as a Recommended Standard 232 (RS-232) interface, for interfacing the device 100 with one or more personal computer (PC) devices 190. The I/O interface 140 may also comprise an audio interface for communicate audio signals to one or more audio devices 1050, such as a speaker or a buzzer.

The device 100 also comprises a network interface 170 for communicating with one or more computer networks 180. The network 180 may be a wired network, such as a wired Ethernet™ network or a wireless network, such as a Bluetooth™ network or IEEE 802.11 network. The network 180 may be a local area network (LAN), such as a home or office computer network, or a wide area network (WAN), such as the Internet or private WAN.

The device 100 comprises an arithmetic logic unit or processor 1000 for performing the computer program code instructions. The processor 1000 may be a reduced instruction set computer (RISC) or complex instruction set computer (CISC) processor or the like. The device 100 further comprises a storage device 1030, such as a magnetic disk hard drive or a solid state disk drive.

Computer program code instructions may be loaded into the storage device 1030 from the storage media 120 using the storage medium reader 130 or from the network 180 using network interface 170. During the bootstrap phase, an operating system and one or more software applications are loaded from the storage device 1030 into the memory 110. During the fetch-decode-execute cycle, the processor 1000 fetches computer program code instructions from memory 110, decodes the instructions into machine code, executes the instructions and stores one or more intermediate results in memory 100.

In this manner, the instructions stored in the memory 110, when retrieved and executed by the processor 1000, may configure the computing device 100 as a special-purpose machine that may perform the functions described herein.

The device 100 also comprises a video interface 1010 for conveying video signals to a display device 1020, such as a liquid crystal display (LCD), cathode-ray tube (CRT) or similar display device.

The device 100 also comprises a communication bus subsystem 150 for interconnecting the various devices described above. The bus subsystem 150 may offer parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like.

Network of Computing Devices

Figure 2:
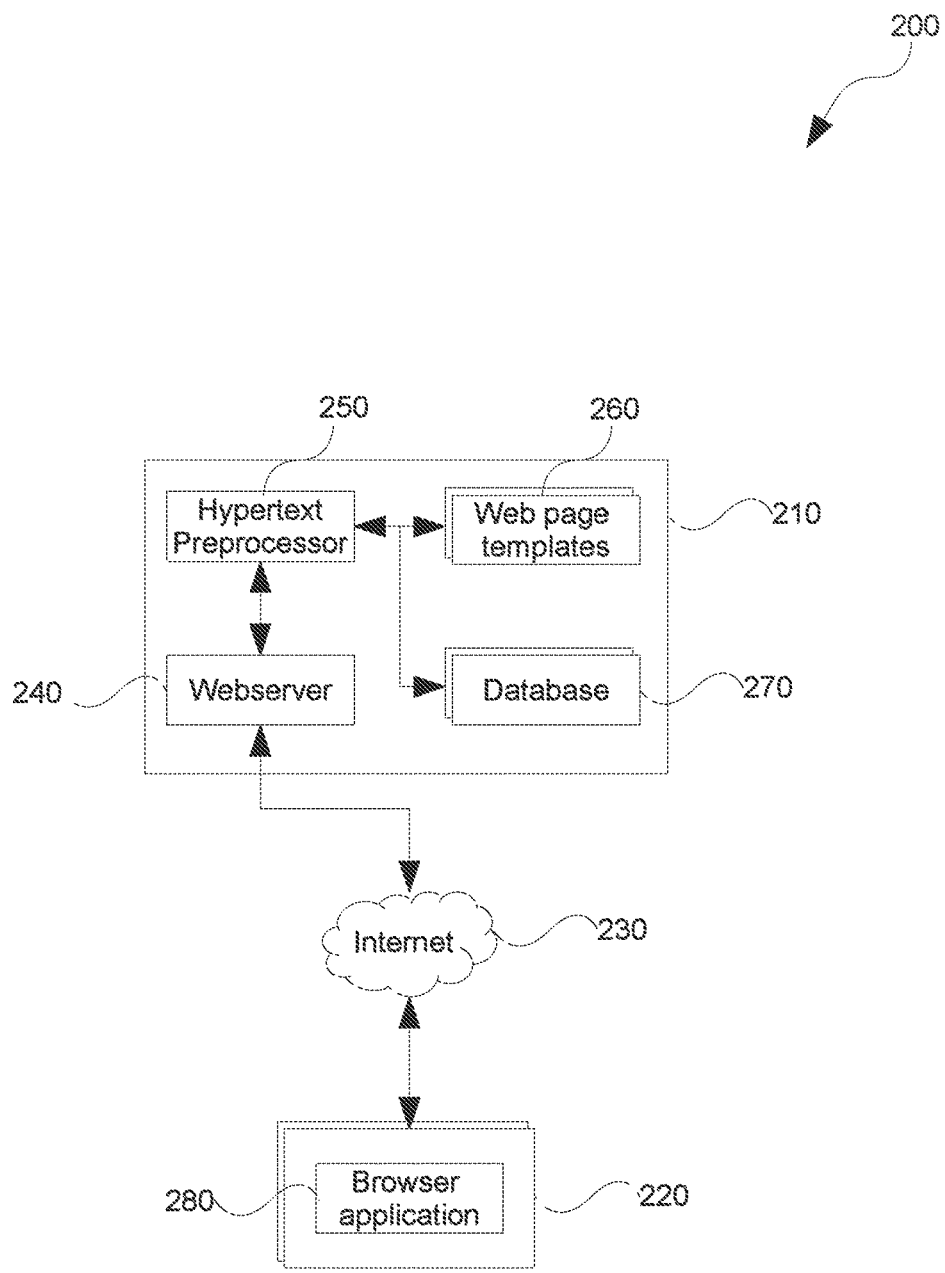
FIG. 2 shows a network of computing devices on which the various embodiments described herein may be implemented in accordance with an embodiment of the present invention.

FIG. 2 shows a network 200 of computing devices 100 on which the various embodiments described herein may be implemented. The network 200 comprises an application server 210 (web server) for serving web pages to one or more client computing devices 220 over the Internet 230.

The application server 210 is provided with a web server application 240 for receiving requests, such as Hypertext Transfer Protocol (HTTP) and File Transfer Protocol (FTP) requests, and serving hypertext web pages or files in response. The web server application 240 may be, for example the Apache™ or the Microsoft™ IIS HTTP server.

The application server 210 is also provided with a hypertext preprocessor 250 for processing one or more web page templates 260 and data from one or more databases 270 to generate hypertext web pages. The hypertext preprocessor may, for example, be the PHP: Hypertext Preprocessor (PHP) or Microsoft Asp™ hypertext preprocessor. The application server 210 is also provided with web page templates 260, such as one or more PHP or ASP files.

Upon receiving a request from the web server application 240, the hypertext preprocessor 250 is operable to retrieve a web page template, from the web page templates 260, execute any dynamic content therein, including updating or loading information from the one or more databases 270, to compose a hypertext web page. The composed hypertext web page may comprise client side code, such as Javascript, for Document Object Model (DOM) manipulating, asynchronous HTTP requests and the like.

Client computing devices 220 are provided with a browser application 280, such as the Mozilla Firefox™ or Microsoft Internet Explorer™ browser applications. The browser application 280 requests hypertext web pages from the application server 210 and renders the hypertext web pages on a display device 1020.

Computer Implemented Method for Generating Project Specific Configuration Data

Figure 3:
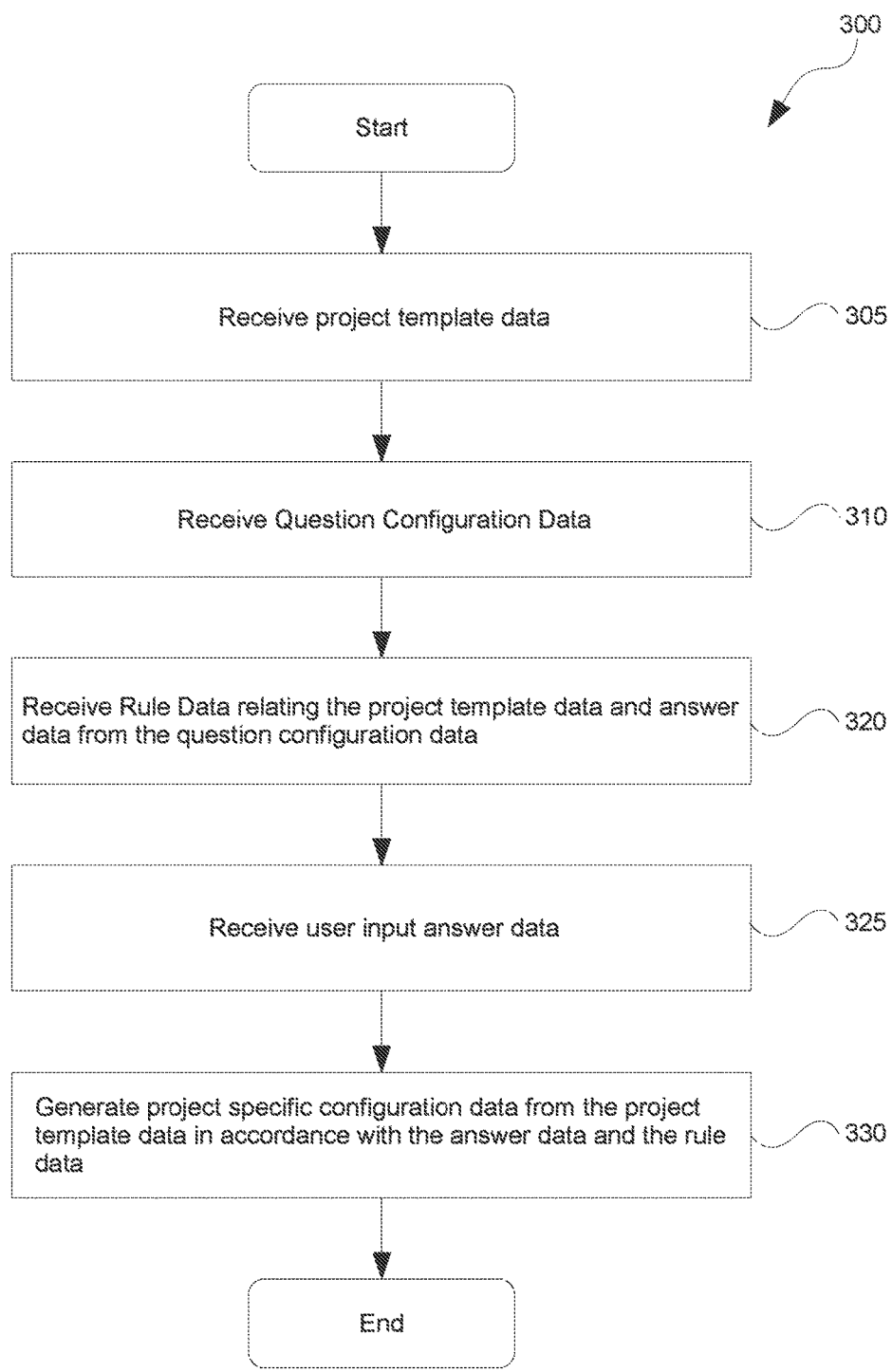
FIG. 3 shows a computer implemented method for generating project specific configuration data in accordance with an embodiment of the present invention.

FIG. 3 shows a computer implemented method 300 for generating project specific configuration data. The method 300 is executed by one or more computing devices 100 and in particular one or more computing devices 100 connected across the Internet 230 as substantially shown in FIG. 2.

Data Schematic for Generating Project Specific Configuration Data

Figure 4:
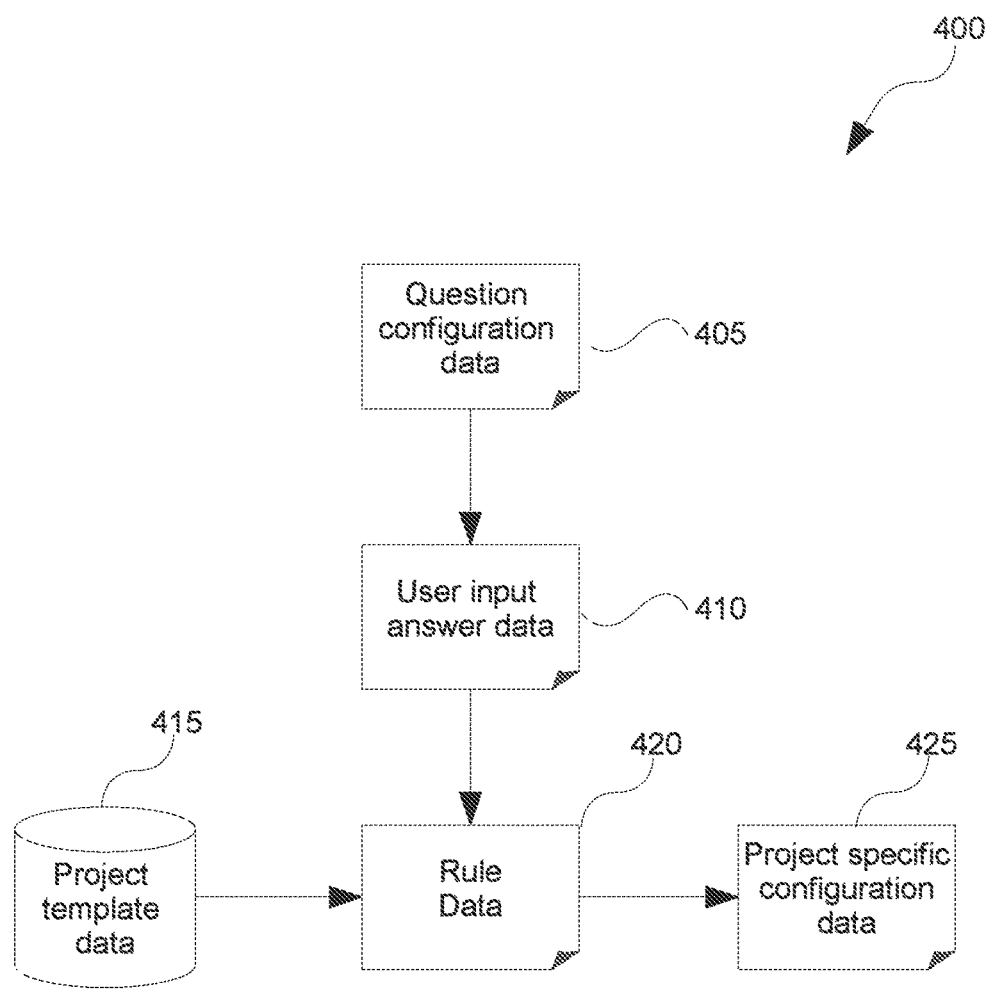
FIG. 4 shows a data schematic for generating project specific configuration data in accordance with another preferred embodiment of the present invention.

As will become apparent from the below description, and referring to the data schematic 400 is shown in FIG. 4, the application server 210 is adapted for generating project specific configuration data 425 for use by an end user when creating project specific configuration data for a particular project. For example, when initiating a new software project or business development project for example, the end-user will employ the application server 210 for the purposes of generating the project specific configuration data 425 for use in relation to the project.

The application server 210 is adapted to generate the project specific configuration data 425 from project template data 415. Specifically, the application server is adapted to present questions to the end user in "wizard" format in accordance with question configuration data 405 so as to be to receive answers from the user relating to the project so that the application server 210 is able to create the project specific configuration data 425. Specifically, the application server 210 employs rule data 420 which maps the user input answer data 410 to the project template data 415.

Generally, the project template data 415, rule data 420 and question configuration data 405 will be configured by a user referred to herein as the admin user.

Another user, herein referred to as the end user, is the person who creates the project specific configuration data each time a new project is initiated and will specify the answer data 410.

Receive Project Template Data 305

The method 300 starts at step 305, where the application server 210 is adapted to receive project template data. As will become apparent from the description herein, the project template data comprises data for various types of projects and is used by the application server 210 in generating the project specific configuration data in accordance with an end user's project specification which is described herein in a preferred embodiment as a "wizard" process comprising a series of questions and answers allowing the end user to specify the project type and requirements.

The application server 210 may receive the project template data in various manners, such as by way of I/O interface 140, network interface 170 or the like. Generally, the project template data is adapted for continual update wherein the admin user continually adds resources, knowledge, content and the like to the project template data for use in subsequent projects.

In a preferred embodiment, the project template data is grouped or categorised into various categories. In this manner, the project data can be stored and retrieved in a logical manner depending on the project requirements. In a yet further preferred embodiment, the categories are hierarchical comprising a hierarchy comprising model, parent project type, project type and sub type/components project categories.

In this manner, the project template data as described in further detail below may be categorised and stored (whether in the database 270, file system or the like) in accordance with the project hierarchy.

Figure 5:
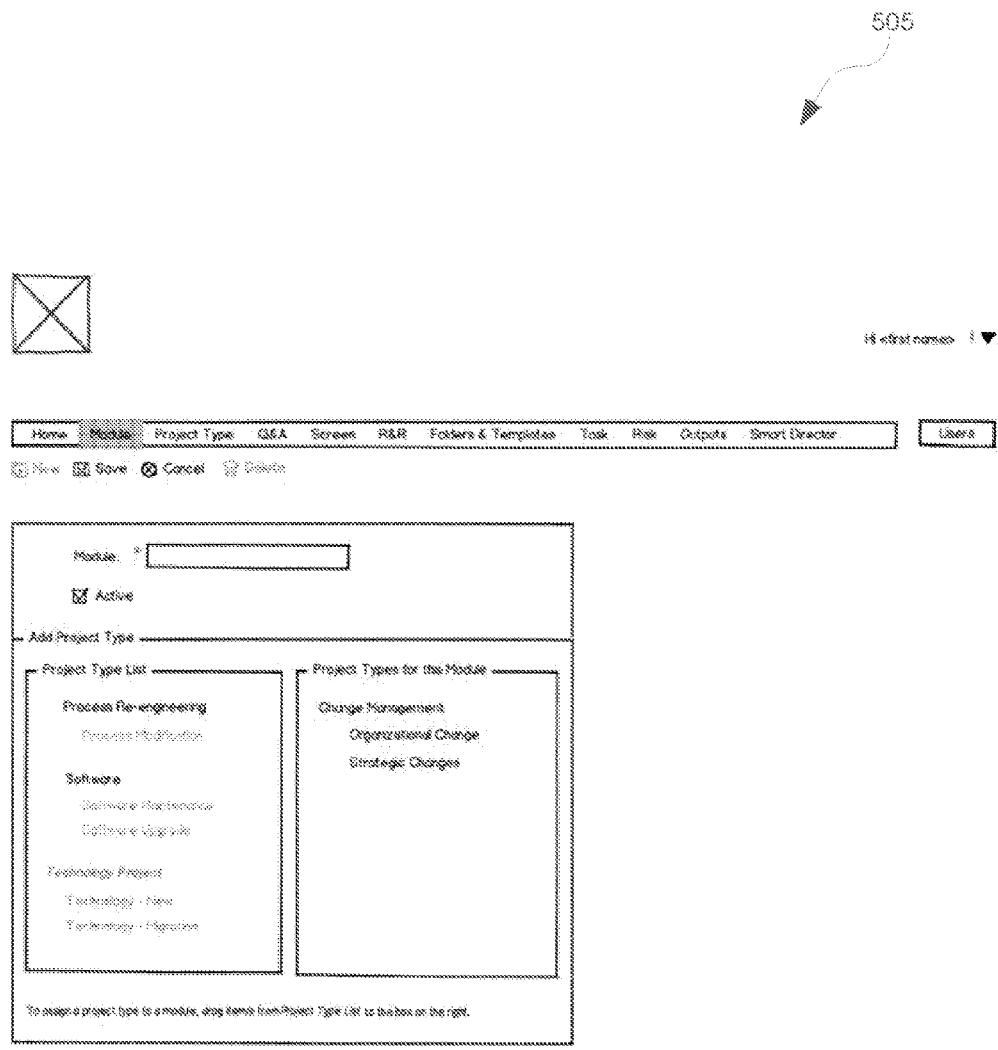

Referring now to the exemplary graphical user interface 505 as substantially shown in FIG. 5, there is shown the interface 505 adapted for allowing the admin user to configure the module category. As is apparent from the interface 505, the admin user is adapted to specify the module (and also indicate whether or not the module is active) and with and the module category, select project types within the module hierarchy by available project types from the available project type list to the project types for the module from left to right. As is apparent from the exemplary embodiment, the module provided relates to projects for change management (the parent project type) including organisational change and strategic changes (the project type).

Figure 6:
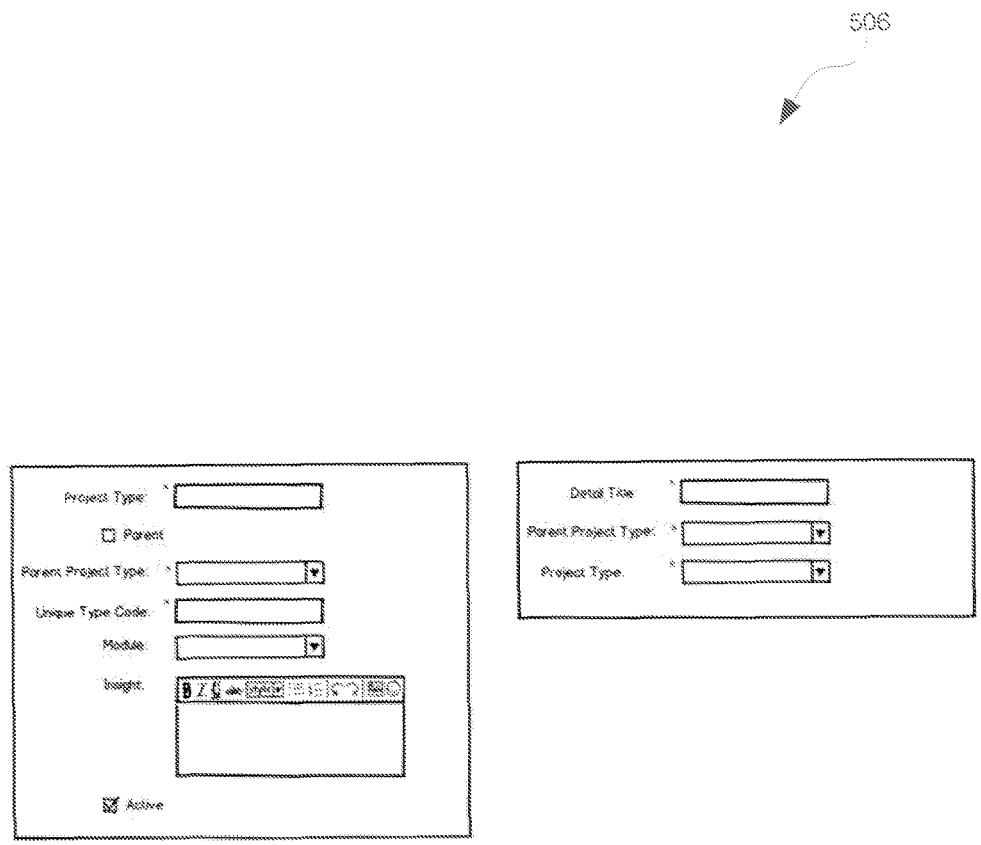

Referring now to the exemplary graphical user interface 506 as substantially shown in FIG. 6, there is shown the interface 506 adapted to allow the admin user to add or edit project types and subcomponents. For example, using the project type editor on the left hand side, the admin user may configure details relating to a project type (such as the organisational change project type referred to above). In this manner, the project type editor comprises edit fields allowing the admin user to edit the name of the project type, a checkbox to specify whether the project type is a parent project type or a project type, a parent project type select, a unique type code, a module selector, an insight input and a checkbox to specify whether the project type is active.

On the right hand side of the exemplary graphical user interface 506 is shown a sub type editor adapted to allow the admin user to edit data at the sub type category of the project type data hierarchy. Using the sub type editor, the admin user may input various project template data depending on the application. In a preferred embodiment, the sub type editor is adapted to allow the admin user to input sub types having differing project template data comprising:
Insights based on experience;
Tasks;
Roles and responsibilities;
Risks;
Folders and templates/documents;
Information about subject matter experts;
Stakeholder insights; and
Information about compliance with regulations and standards It should be noted that while the above project template data is discussed as being associated with a sub type, the above project template data may also be associated with either a project type or a sub type. Generally, sub types are associated with tasks whereas the other project template data would be associated with project types.

Figure 7:
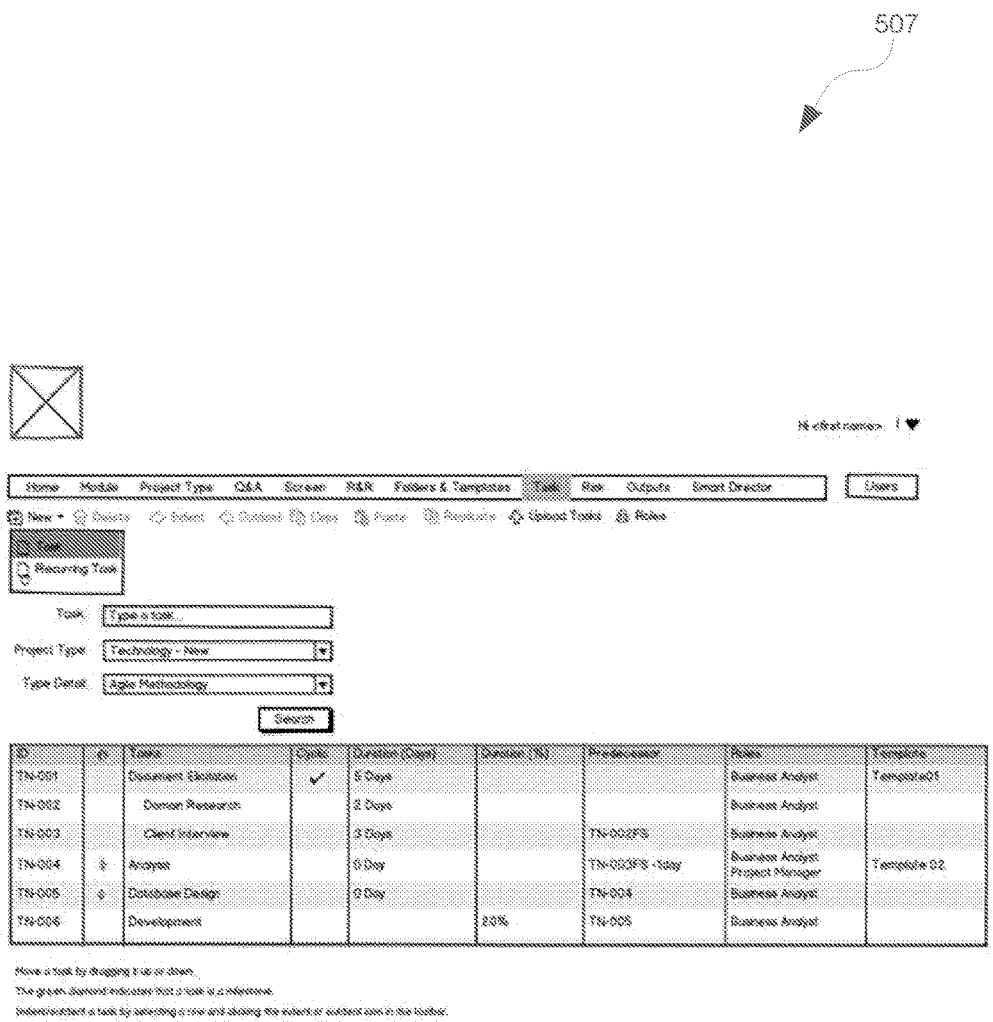

Specifically, referring to the exemplary graphical user interface 507 as substantially shown in FIG. 7, there is shown the interface 507 adapted for allowing the admin user to configure project task template data representing at least one project task template to be generated for a project.

Figure 8:
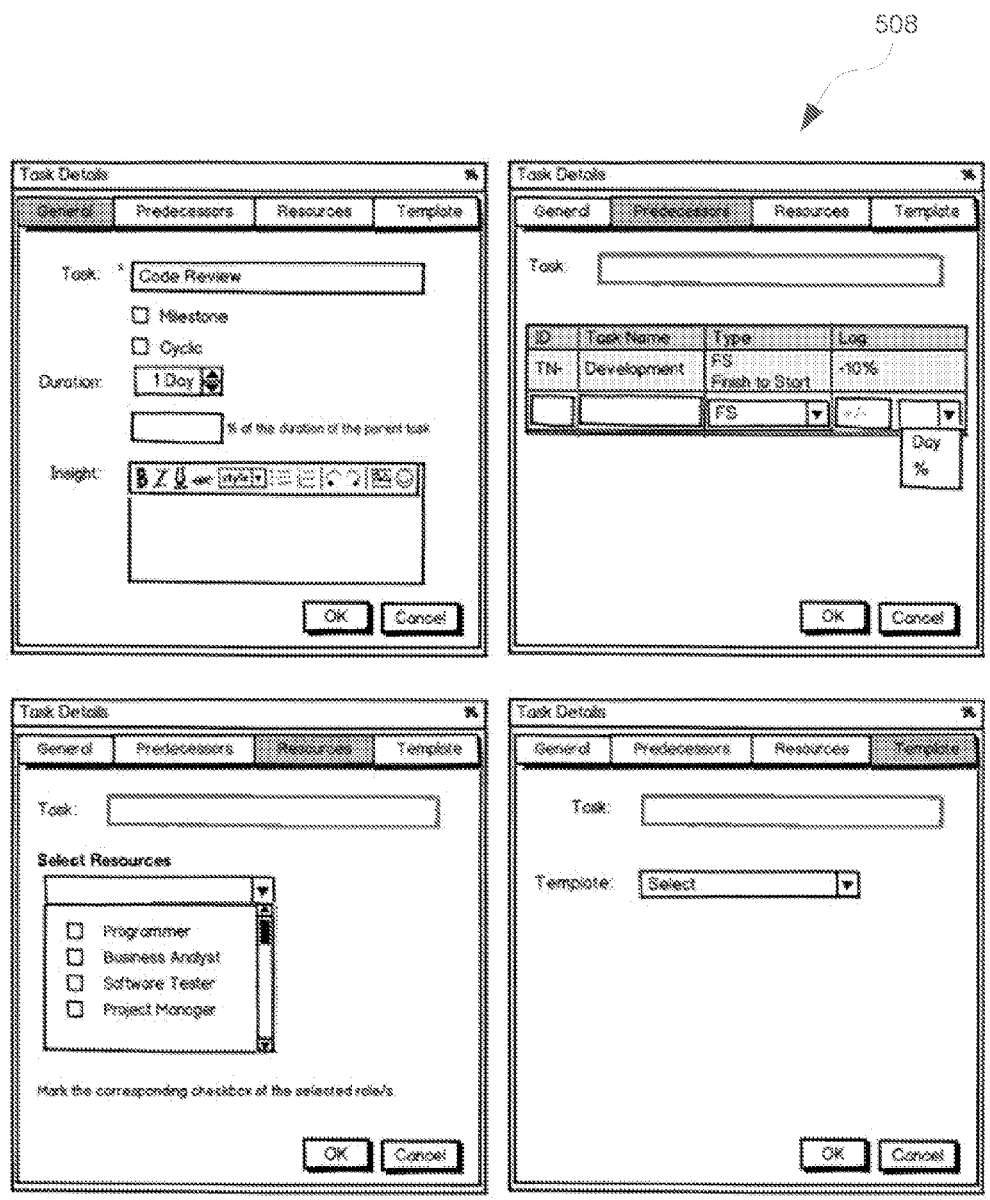
Figure 9:
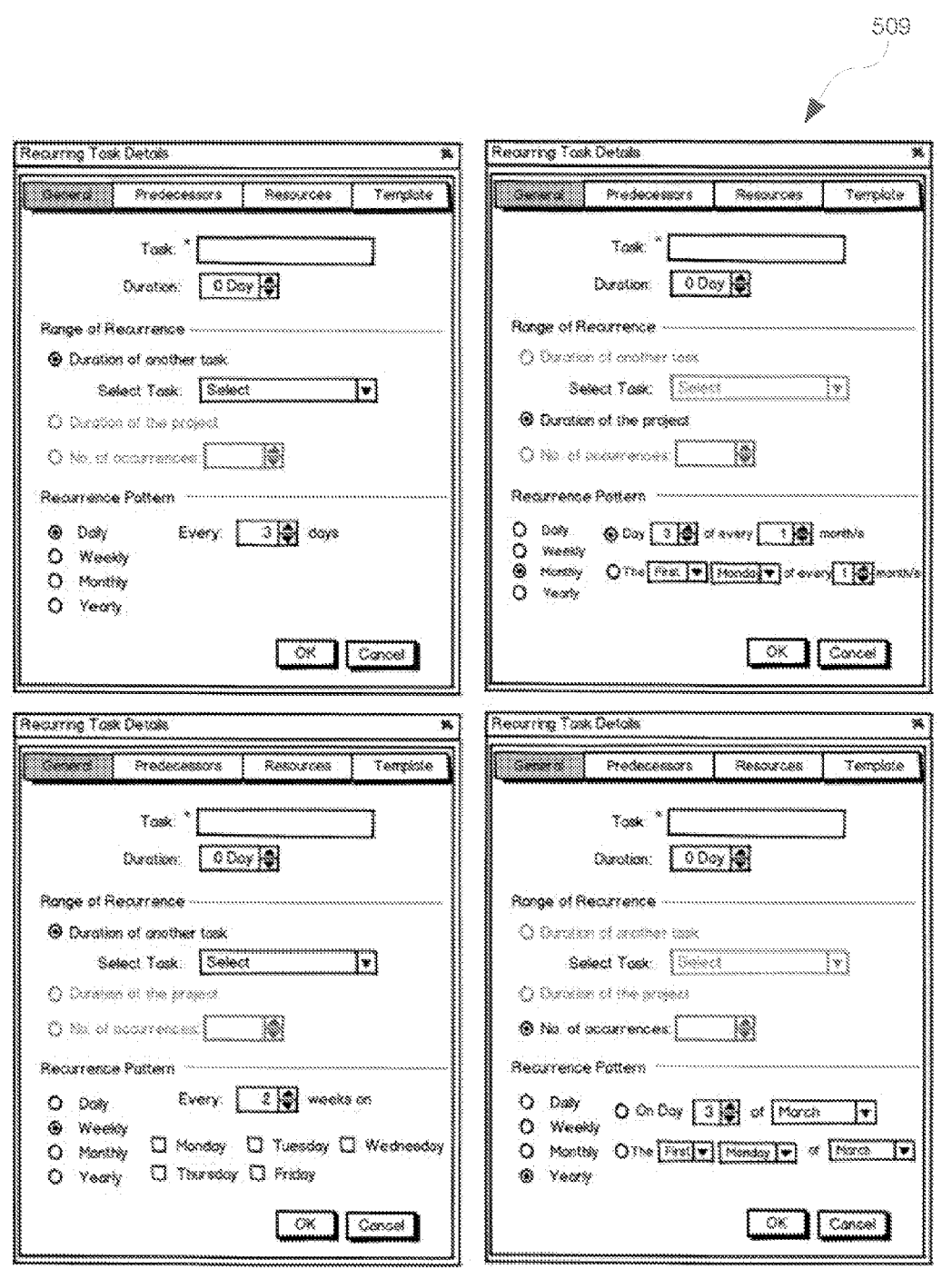

Specifically, each project task template comprises a unique identification number, a task description, a duration for completion of the task, a task predecessor for the task, a role representing the responsible role for the completion of the task and, where applicable, a template for use in the completion of the task. Referring to the exemplary graphical user interface 508 as substantially shown in FIG. 8, there is shown the interface 508 adapted to allow the admin user to configure the task description, the duration for completion of the task, the task predecessor for the task, the role representing the responsible role for the completion of the task and a template for use in the completion of the task. Referring to the exemplary graphical user interface 509 as substantially shown in FIG. 9, there is shown the interface 509 adapted for allowing the admin user to specify how the task is to recur. Furthermore, the admin user may enter insights on prior experience and configure whether the task is a milestone.

In this manner, task templates may be added, edited and deleted for each project. As such, when the application server 210 generates the project specific configuration data, the project specific configuration data will comprise task data representing at least one task for completion in relation to the project as specified by the admin user.

Figure 10:
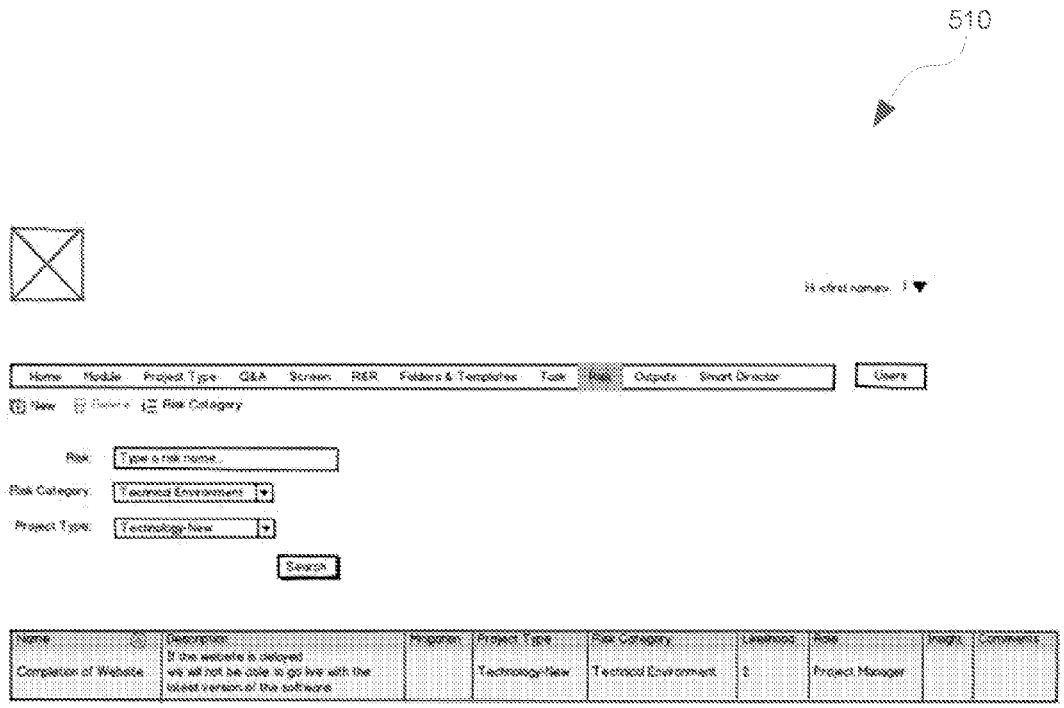

As alluded to above, the project template data may specify various risks in relation to various projects. Specifically, referring to the exemplary graphical user interface 510 as substantially shown in FIG. 10, there is shown the interface 510 adapted for allowing the admin user to specify risks template data in relation to a project type. Specifically, in the example given there has been an input indicating that there is a risk that the completion of a website will not be able to go live with the latest version of the software in the event of the website being delayed. As is also evident from the interface 510, the risk template data comprises role data representing a role responsible for managing the risk. Using the example, it is apparent that the project manager is responsible for managing the risk of the website being delayed.

In certain embodiments, the interface 510 maybe adapted such that risk categories can be assigned for each risk.

Yet further, as alluded to above, the project template data may comprise roles template data representing at least one role such that, in generating the project task data, the application server is adapted to generate responsibility data representing at least one responsibility for each role in accordance with the role template data and the project task template data.

Figure 11:
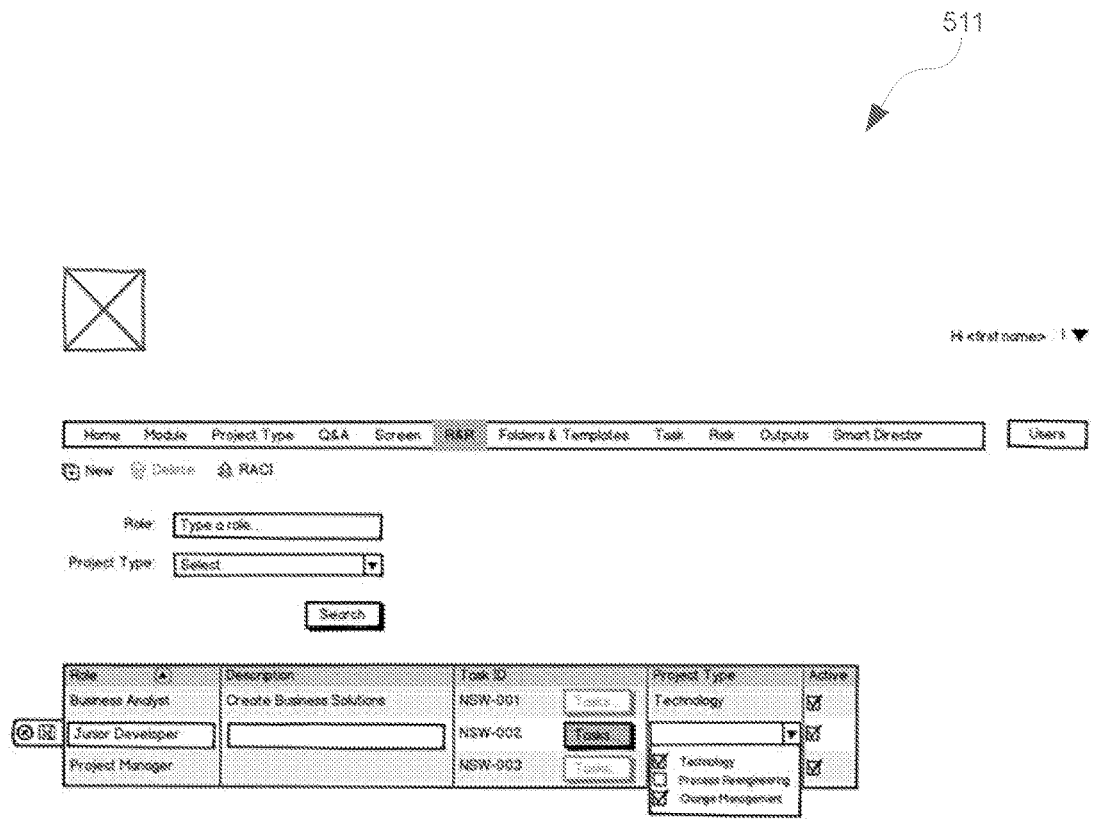

Specifically, referring to the exemplary graphical user interface 511 as substantially shown in FIG. 11, there is shown the interface 511 configured for allowing the admin user to create, edit and delete responsibilities for each role. Specifically, in the example given the roles of business analyst, junior developer and project manager has been created. For the selected role of junior developer, the admin user is able to save changes made to the interface or delete the role. Furthermore, the interface 511 is adapted for allowing various tasks to be assigned to each role.

Figure 12:
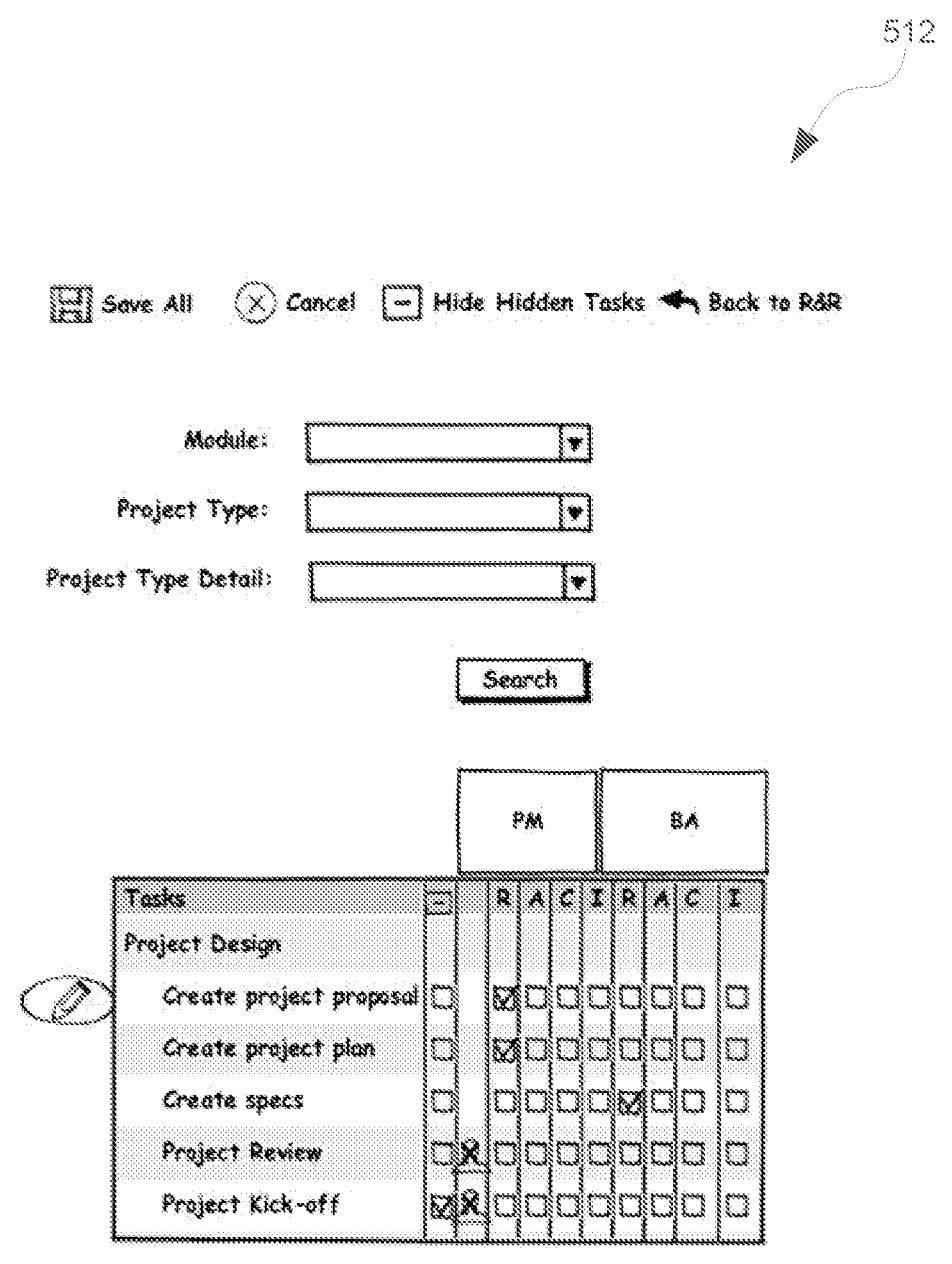

Furthermore, the application server 210 may be adapted to assign a responsibility type to each task for each role. Specifically, referring to the exemplary graphical user interface 512 as substantially shown in FIG. 12, there is shown a RACI (responsible, comfortable, consulted, informed) matrix showing the type of responsibility for each task. For example, for each task, the type of responsibility may also be configured such as whether the role should be responsible, accountable, or merely consulted or informed. For example, the interface 512 shows that role PM is responsible for creating a project proposal and creating the project plan, whereas role BA is responsible for creating the specifications.

As also alluded to above, in a preferred embodiment, in generating the project specific configuration data, the application server 210 is adapted to configure a file system directory in accordance with a template structure. In this manner, those subsequently working on the project may use the file system directory structure in an approved manner. Furthermore, the application server 210 may be adapted to populate various folders of the directory structure with templates and or other data including file data.

Figure 14:

Specifically, referring to the exemplary graphical user interface 514 as substantially shown in FIG. 14, there is shown the interface 514 adapted for allowing the admin user to specify a directory structure using the provided tree edit control. In this manner, when the application server 210 generates the project specific configuration data on the application server 210 is adapted to create the directory structure either on the application server 210 on one or more target machines. As is apparent, the interface 514 also allows the admin user to load or select templates for inclusion within each folder of the directory structure.

Figure 13:
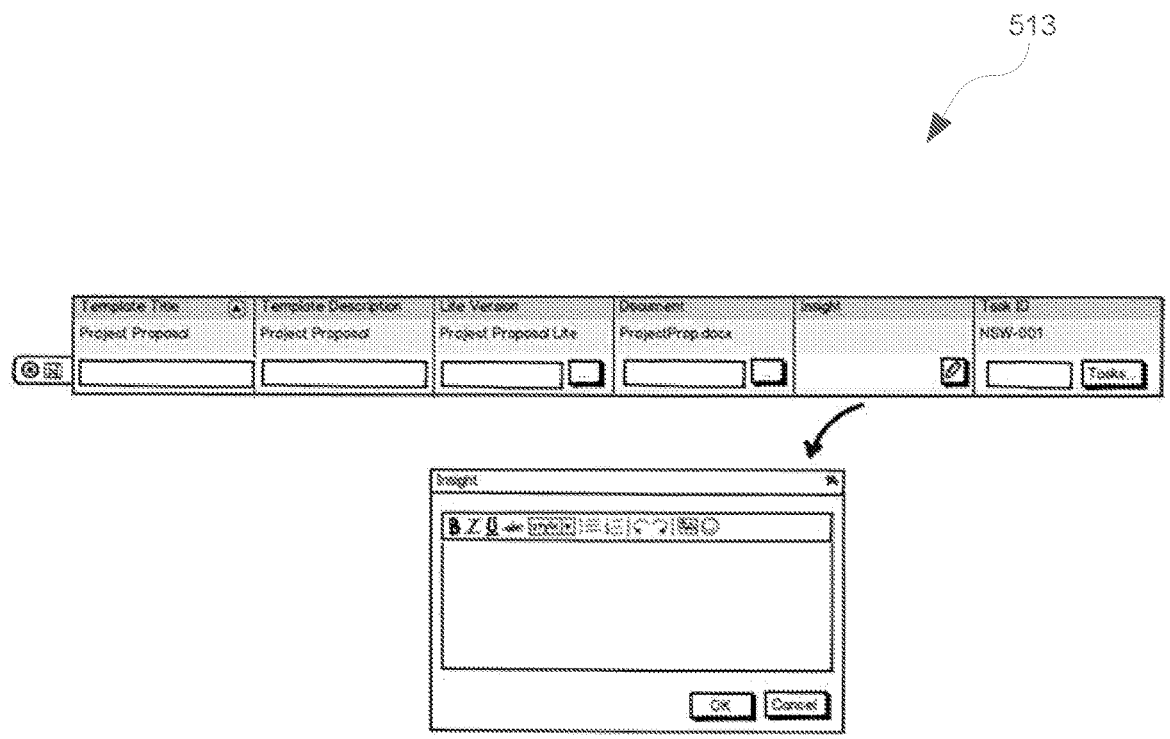

Specifically, referring to the exemplary graphical user interface 513 as substantially shown in FIG. 13, there is shown the interface 513 adapted for receiving template data for inclusion in a folder. The interface 513 comprises input fields allowing the admin user to upload various documentation and input annotations.

Figure 15:
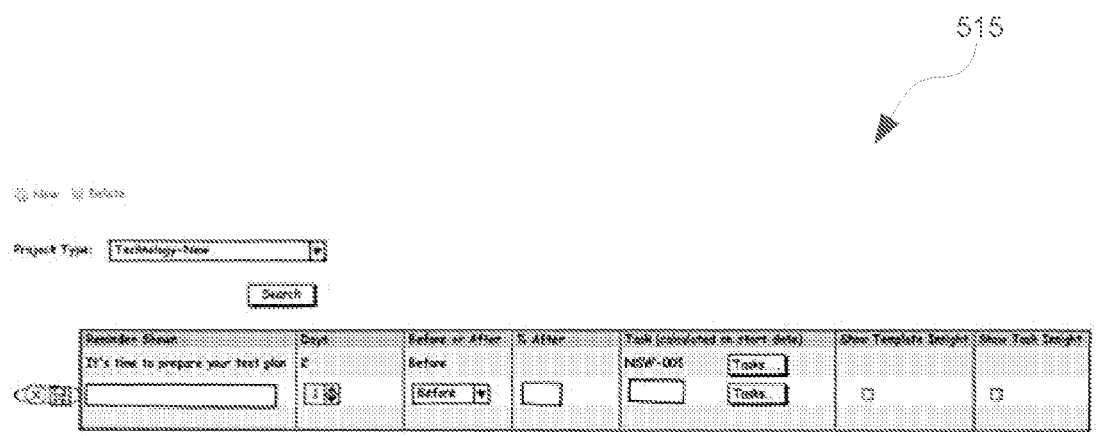

In one embodiment, the application server 210 is adapted to allow the admin user to configure reminder template data representing at least one reminder in relation to a specific project. Such reminders are used where project tasks are not appropriate. For example, a reminder may be generated for a particular role such as a reminder relating to performing a review of the project. Referring to the exemplary graphical user interface 515 as substantially shown in FIG. 15, there is shown the interface 515 adapted for allowing the admin user to configure one or more reminders. The reminders may be configured to trigger at a certain percentage completion of a project or in relation to certain project tasks such as three days before a particular task completion.

Receive Question Configuration Data

At step 310 of method 300, the application server 210 is adapted to receive question configuration data. Generally, an organisation will build a set of questions and answers (question configuration data) that relate to different aspects of the project or activity.

For example different types of tasks that might be or not be undertaken, the different types of skills of people that will be available to perform the activity or project. These could be related to organisational specific information such as whether the project affects Finance or Technology staff members, whether the project impacts the General Ledger, Human Resources or Payroll systems and the like.

In another example, the question configuration data could be specifically about the way the organisation makes decisions around governing a project, for example, does this project have a budget greater than $1 million. As will be discussed in further detail below, the question configuration data is used by the application server 210 in conjunction with the rule data (described below) so as to be able to generate project specific configuration data in accordance with a end users answers of the question data.

Figure 16:
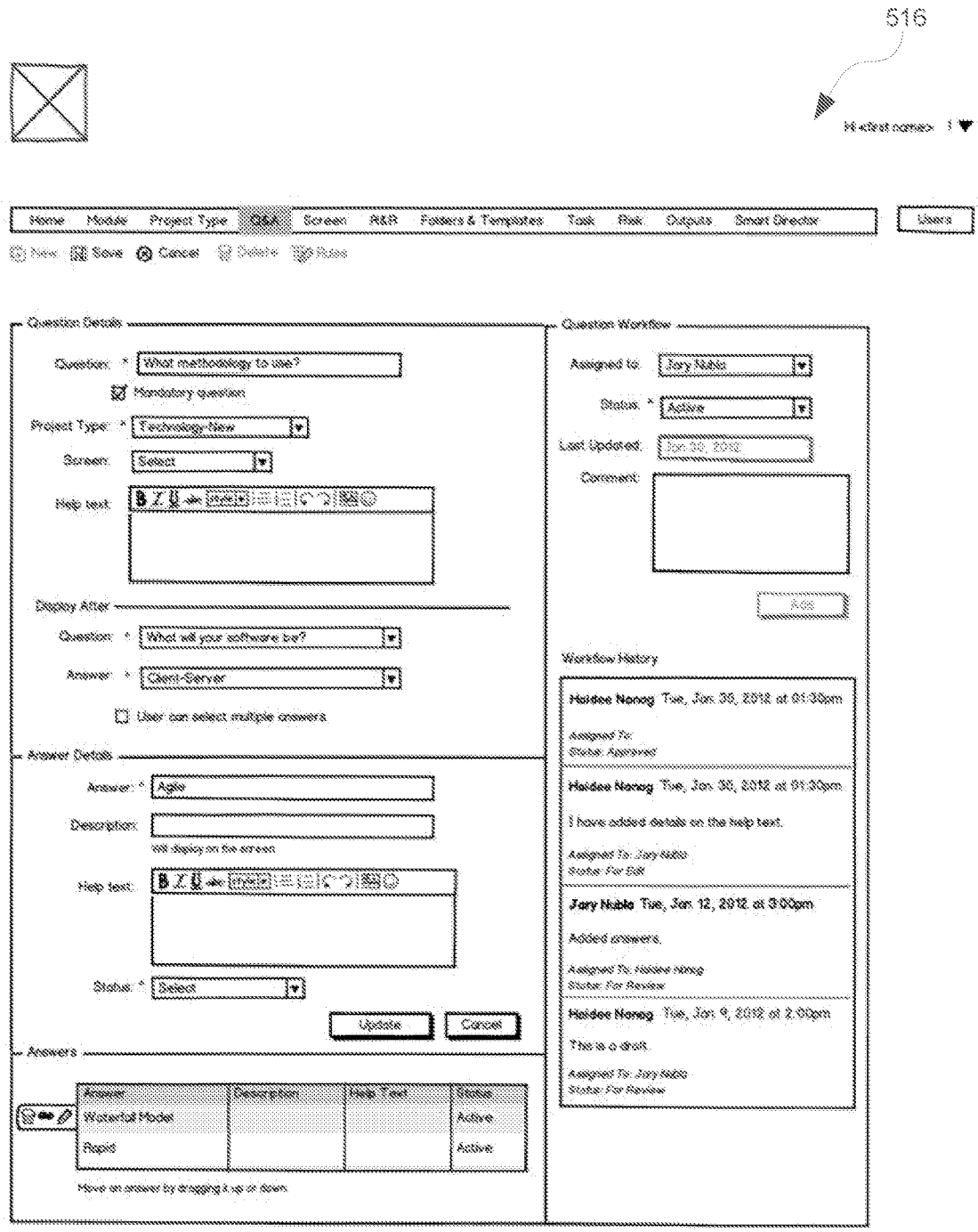

Specifically, referring to the exemplary graphical user interface 516 as substantially shown in FIG. 16, there is shown the interface 516 adapted for allowing the admin user to configure the question data. As is apparent from the interface 516, the interface 516 has a question details section allowing the admin user to specify the details relating to the question. In this example, the question relates to "what methodology is used" for the project. Also within the question details section is a "display after" section adapted for allowing the admin user to specify a question, trigger or rule which would cause the question to be displayed. In a given example, the "display after" section specifies that if the end user answers "client server" to the question "what will your software be?" Then the current question (i.e. "what methodology to use") should be displayed.

Beneath the question details section is the answer details section allowing the admin user to configure an answer. In this section, the answer may be associated with a description and associated help text.

Beneath the answer details section is an answer section comprising a set of candidate answers. Selecting each of these candidate answers will allow the admin user to configure the answer in the answer details section above.

Figure 17:
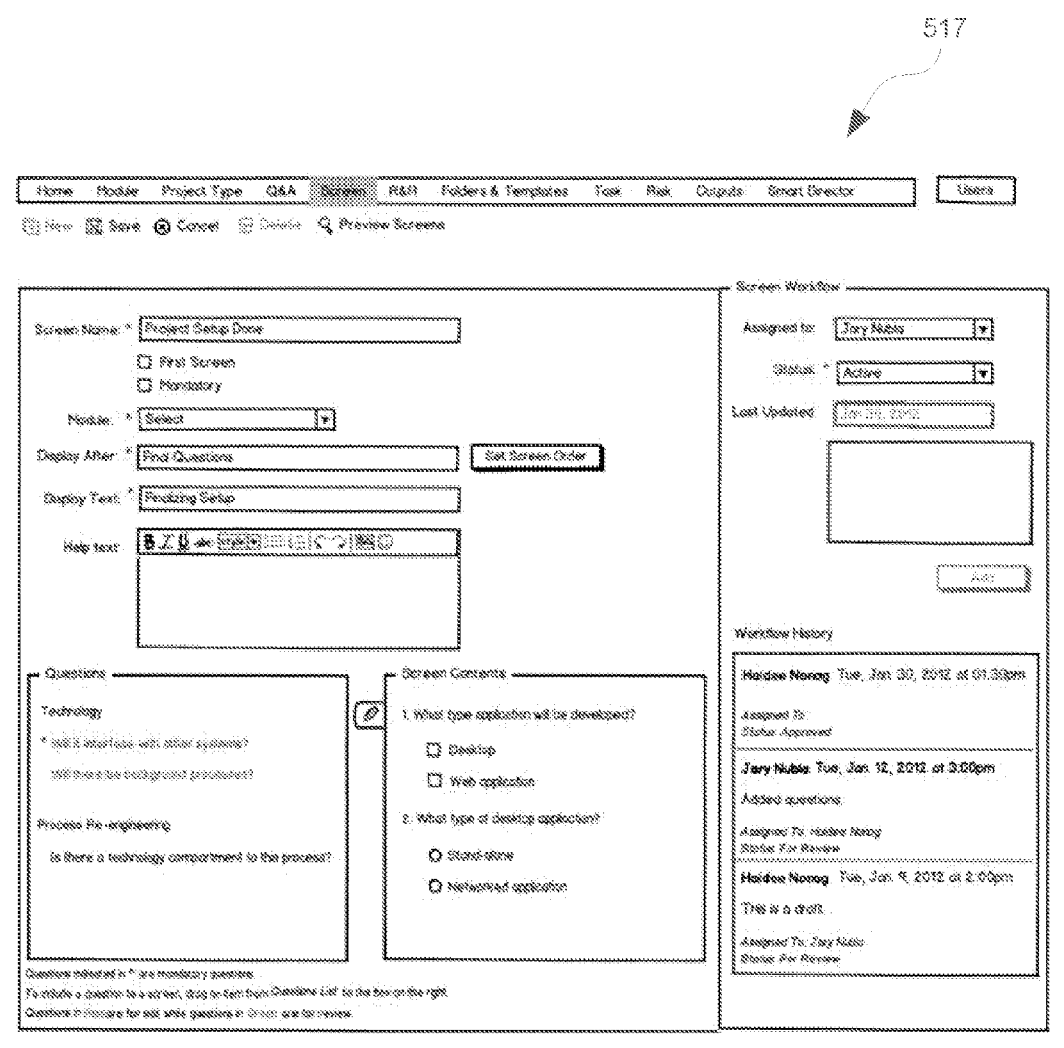

Furthermore, referring to the exemplary graphical user interface 517 as substantially shown in FIG. 17, there is shown the interface 517 adapted for allowing the admin user to configure the sequence of the question screens that will be presented to the end user. In this manner, the admin user is able to configure a question "wizard" which will step the end user through a series of questions.

Figure 18:
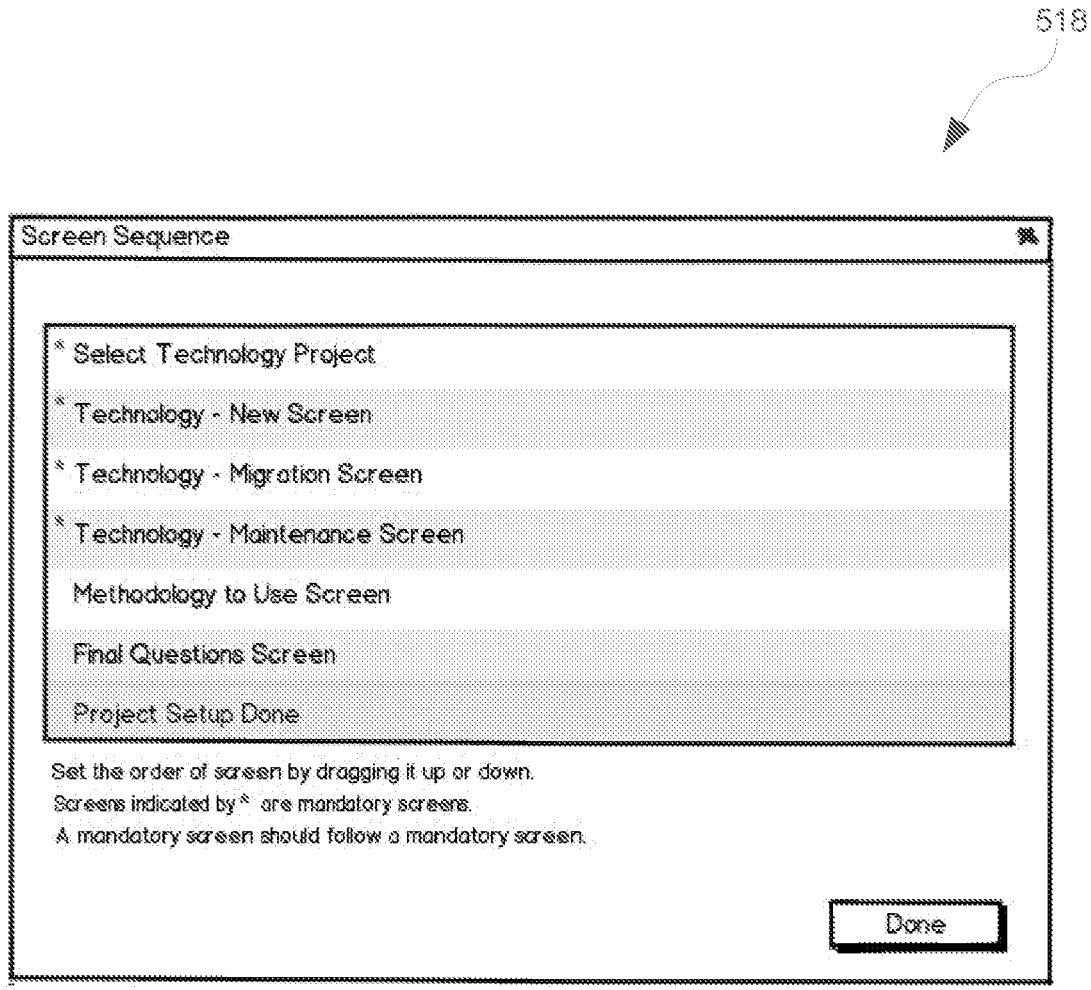

Graphical user interface 518 as substantially shown in FIG. 18 comprises an interface 518 displaying the order of the question screens of the question wizard. The admin user is able to drag and drop question screens with the interface to reorder the display of question screens. The question screens marked with the asterisk denote those question screens that are mandatory.

Receive Rule Data Relating to the Project Template Data and the Question Configuration Data At step 320 of method 300, the application server 210 is adapted to receive rule data. As will be described in further detail below, the rule data is adapted for use by the application server in relating the project template data and the question configuration data in generating the project specific configuration data.

Figure 19:
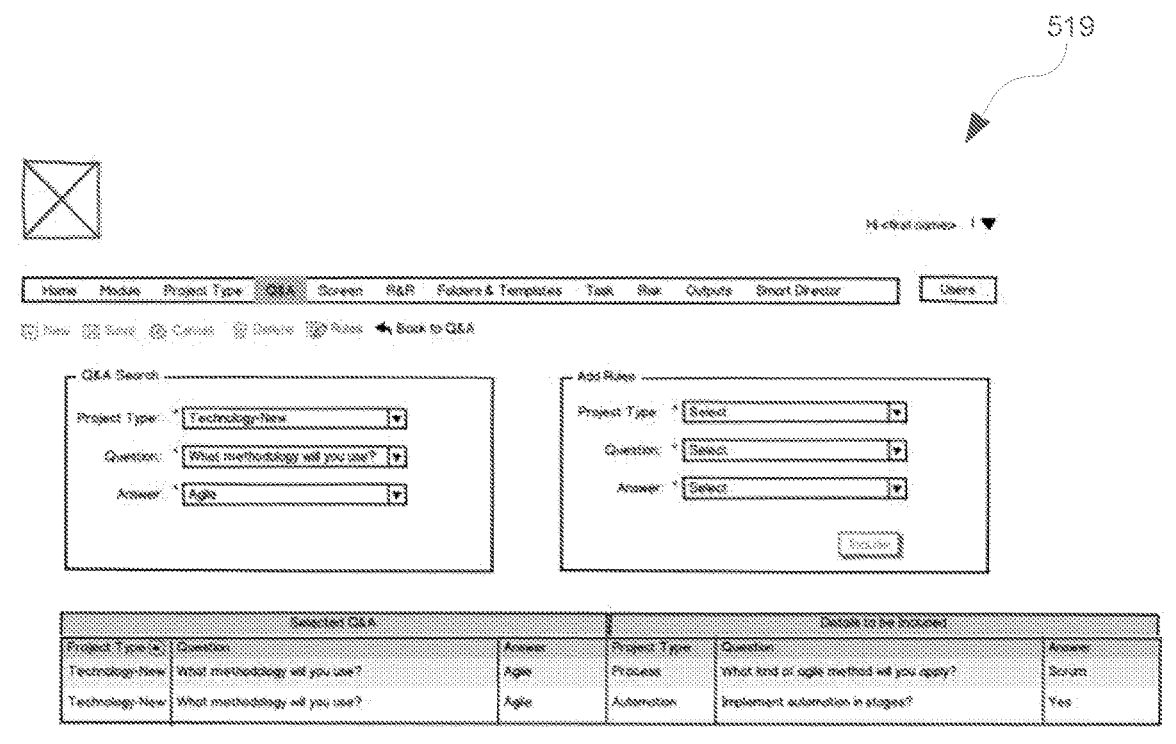

For example, referring to the exemplary graphical user interface 519 as substantially shown in FIG. 19, there is shown the interface 519 adapted for allowing the admin user to specify the auto answer rule data. In this regard, the application server 210 is adapted to automatically answer a question in response to the user having answered another question.

As is apparent from the interface 519, the interface 519 is adapted for allowing the admin user to create and configure different types of rules in accordance with the different types of project template data. In order to create a rule, the admin user selects an answer to a question and thereafter creates a rule associated with the answer.

Figure 20:
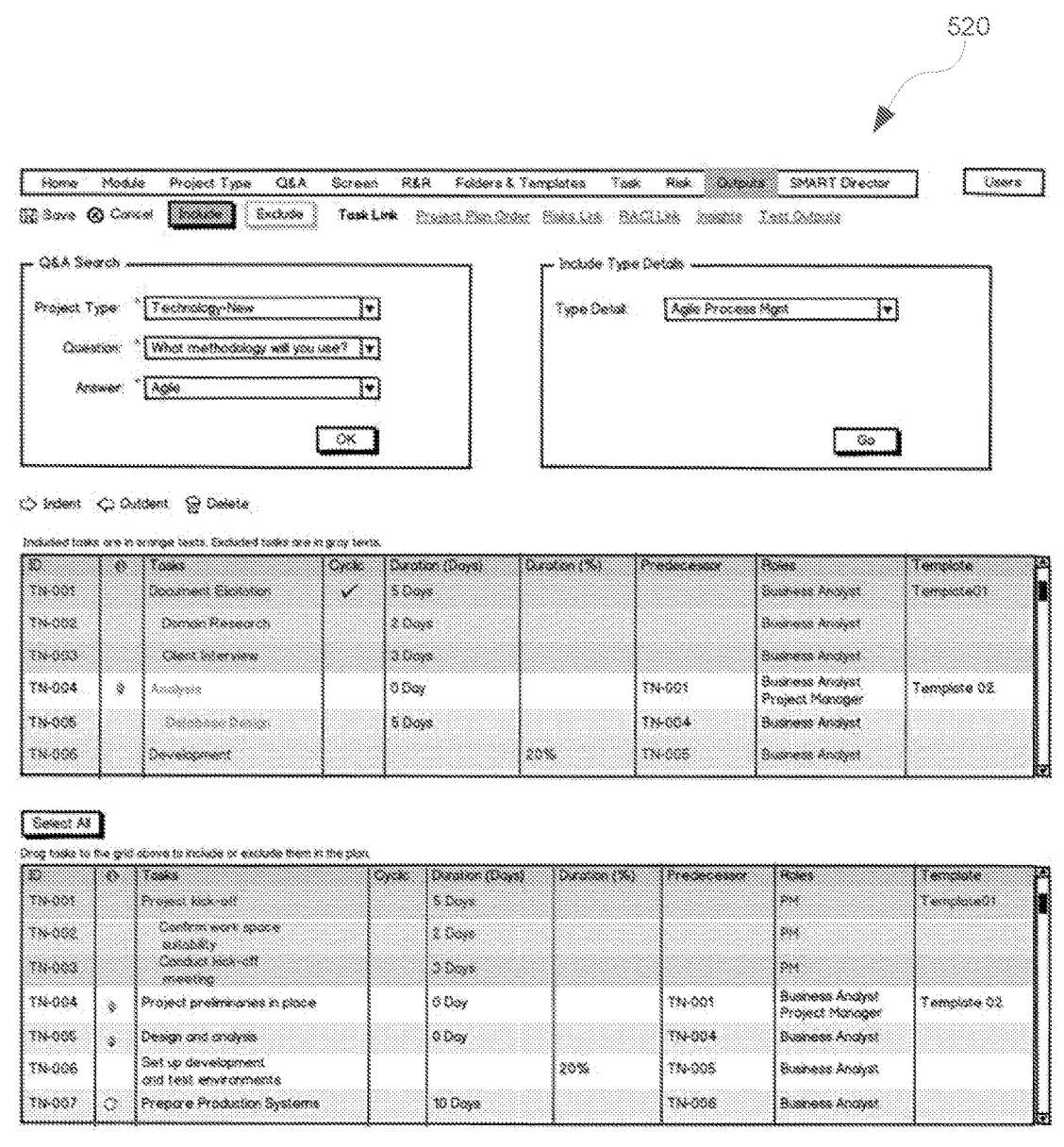

Referring now to the exemplary graphical user interface 520 as substantially shown in FIG. 20, there is shown an example of how the admin user creates rules for tasks. Specifically, the admin user selects an answer that causes the application server 210 to implement a rule. In this manner, the admin user is then able to configure what will happen if the end user selects the selected answer. In this example, the admin user is able to include or exclude tasks in relation to a selected answer for a question.

Figure 21:
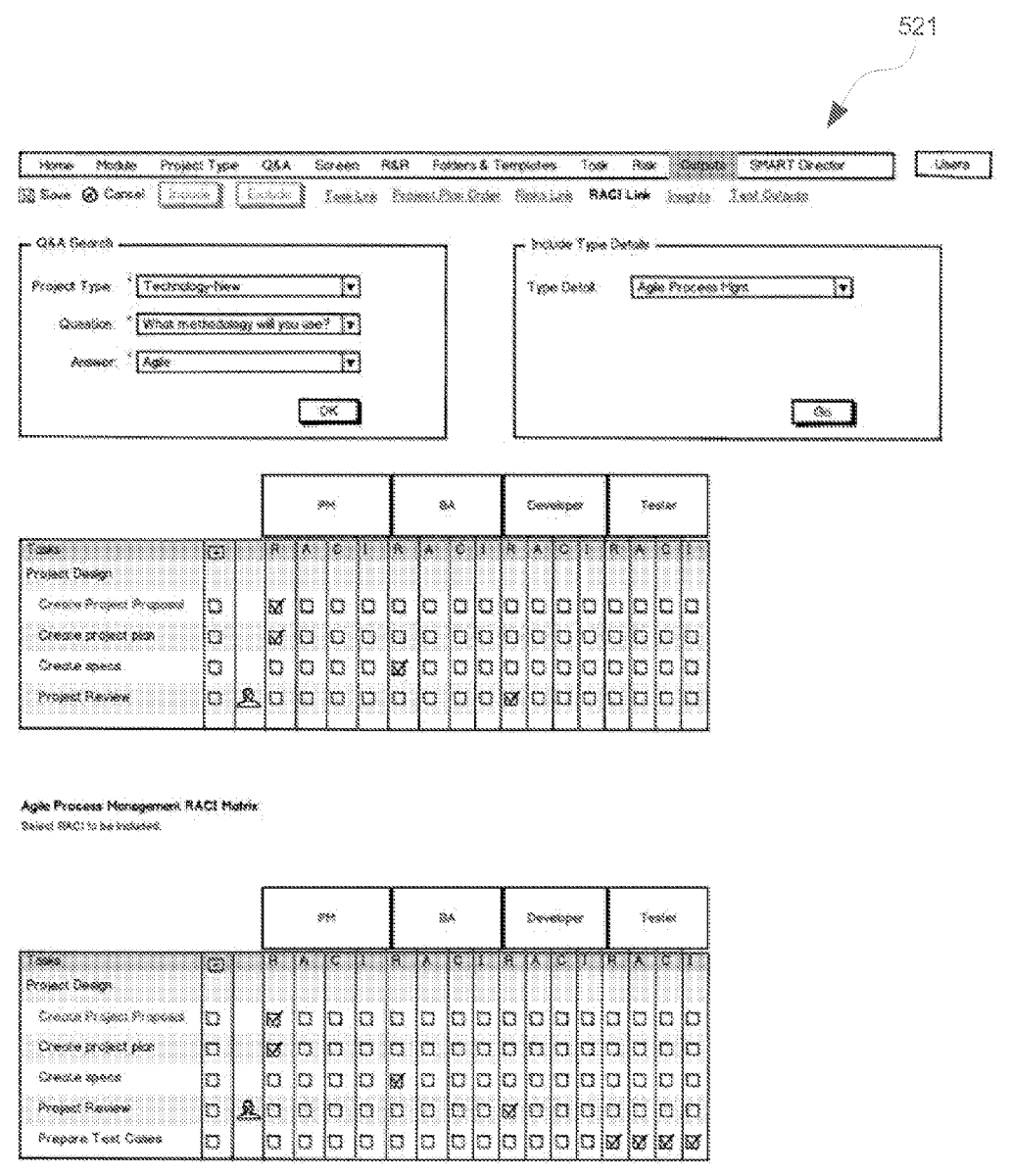

Referring to the exemplary graphical user interface 521 as substantially shown in FIG. 21, there is shown the interface 521 adapted for allowing the admin user to modify the responsibility type for each task, comprising whether the role is responsible, accountable, consulted or informed. In this manner, when the end user answers a question indicating the project requires a human resource representative, the admin user is able to allocate tasks to the human resource representative.

Figure 22:
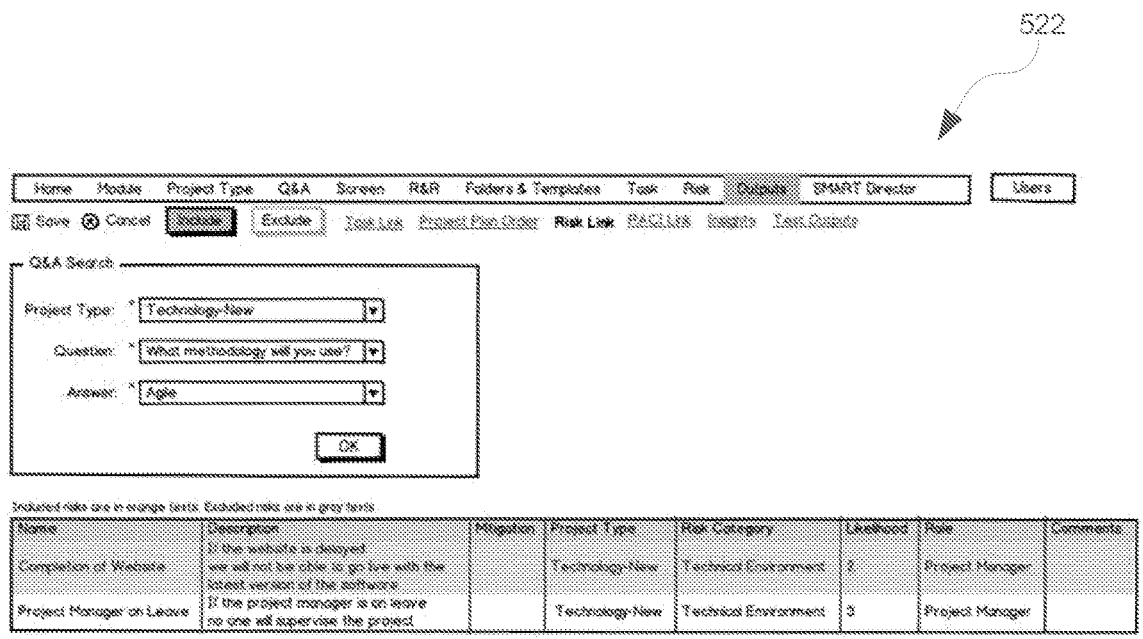

Furthermore, referring to the exemplary interface 522 as shown in FIG. 22, there is shown the interface 522 adapted for allowing the admin user to include or exclude risks for a project or activity based on an answer to a question. Yet further, the interface 522 is adapted for allowing the admin user to specify the responsible role for the risk, likelihood of the risk and the likely impact of the risk.

It should be noted that multiple rules may be associated with each answer. Also, the application server 210 may be configured such that the admin user is able to configure default settings for the project specific configuration. In this manner, the end user may simply elect to use the default settings. For example, for folders and templates, the end user may elect to use the default folder structure or alternatively, use a folder structure of their choice.

Receive User Input Answer Data

At step 325 of method 300, the application server 210 is adapted to receive user input answer data. As is apparent from the above disclosure, the application server 210 is adapted to generate project specific configuration data in accordance with an end users answers to a series of questions, wherein the application server 210 uses the question configuration data and the rule data for configuring the project specific configuration data in accordance with the end user's answers. Also, as alluded to above, the answer data is received from an end user. In this manner, and admin user may configure the application server in the manner described above wherein the end user inputs the answer data at the creation of each project so as to generate the project configuration data. Further, as also alluded to above, the application server 210 is adapted to employ a wizard to step the user through a series of question screens for receiving answers to the questions presented.

In one embodiment, the application server 210 is adapted to present the questions in accordance with the privileges of the end user. In this manner, the application server 210 may be configured with the end-users privileges such that an authorised and users may not obtain confidential information.

Also, as alluded to above, the presentation of questions need not be a strictly linear or iterative process wherein an answer to a question may cause the application server 210 to generate present an alternative question or skip a series one or more questions as the case may be. Also, as alluded to above, the application server 210 may be adapted to automate the answering of question based on the answers of another question in cases where and answer is really apparent.

Figure 23:
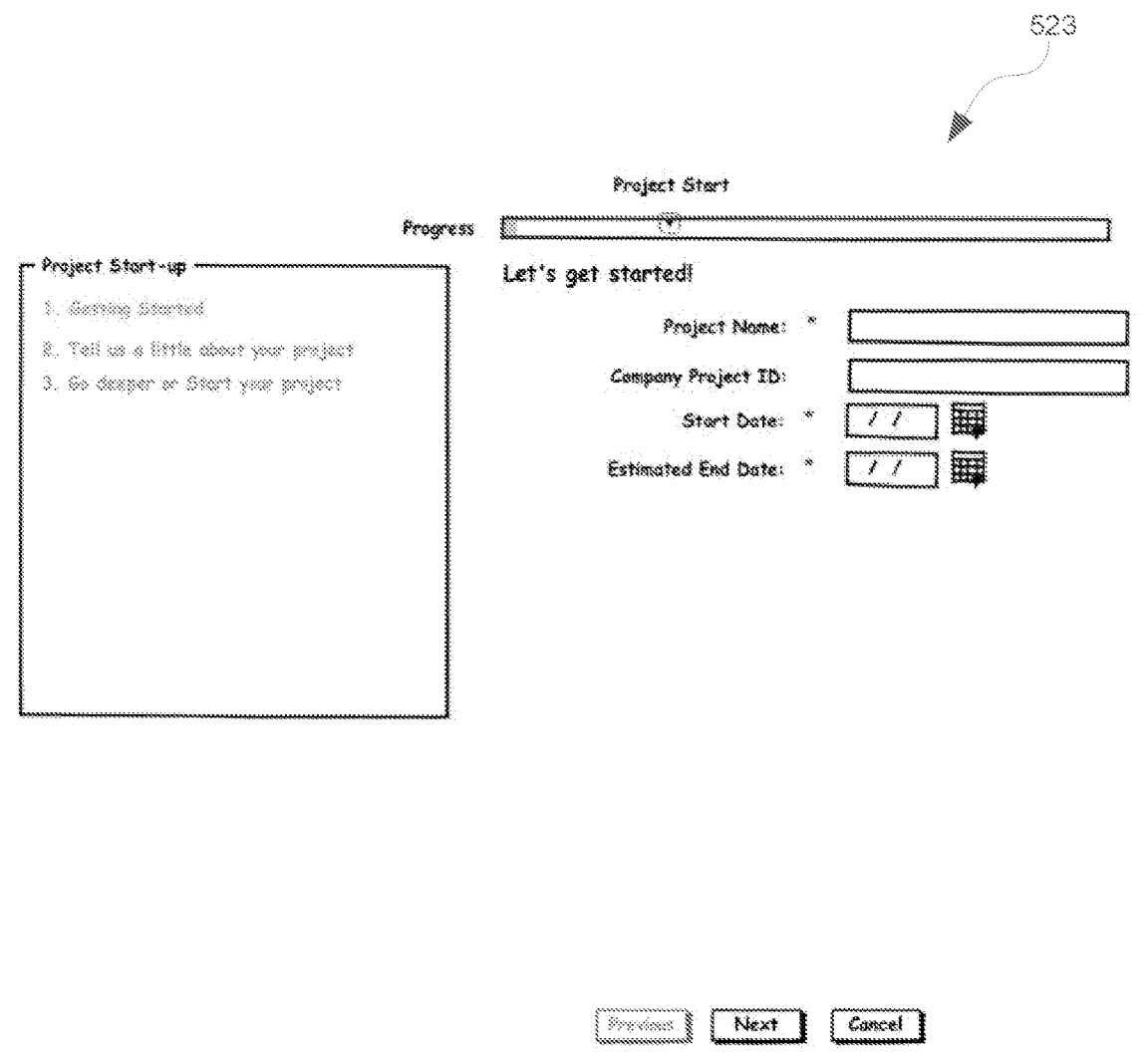

Referring to exemplary interface 523 as substantially shown in FIG. 23, there is shown the first screen of the question wizard. Using the interface 523, the end user is able to specify the project name, their ID and a start and estimated end date for the project. As is apparent from the left hand side of the interface 523, there is shown a link list to each question screen. As the question screens are to be answered in an iterative manner, the links of the link list are disabled until such time that the user has progressed to the relevant question screen.

Figure 24:
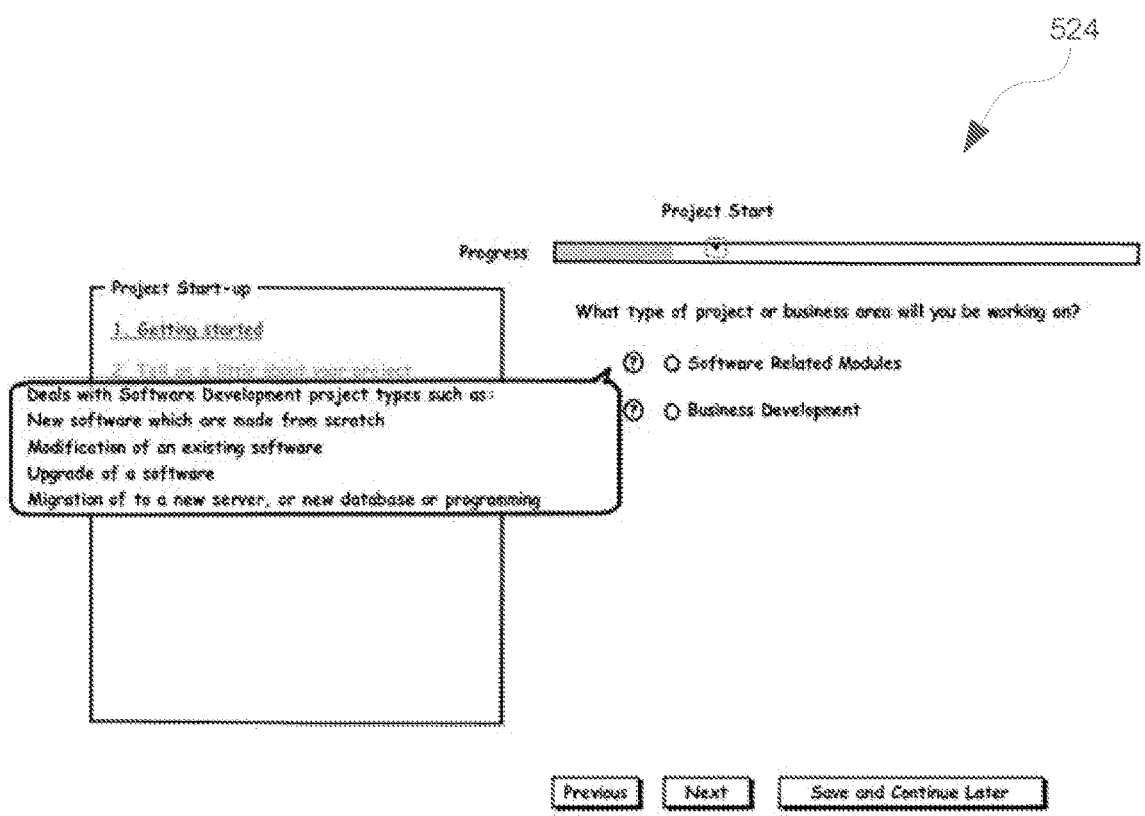
Figure 25:
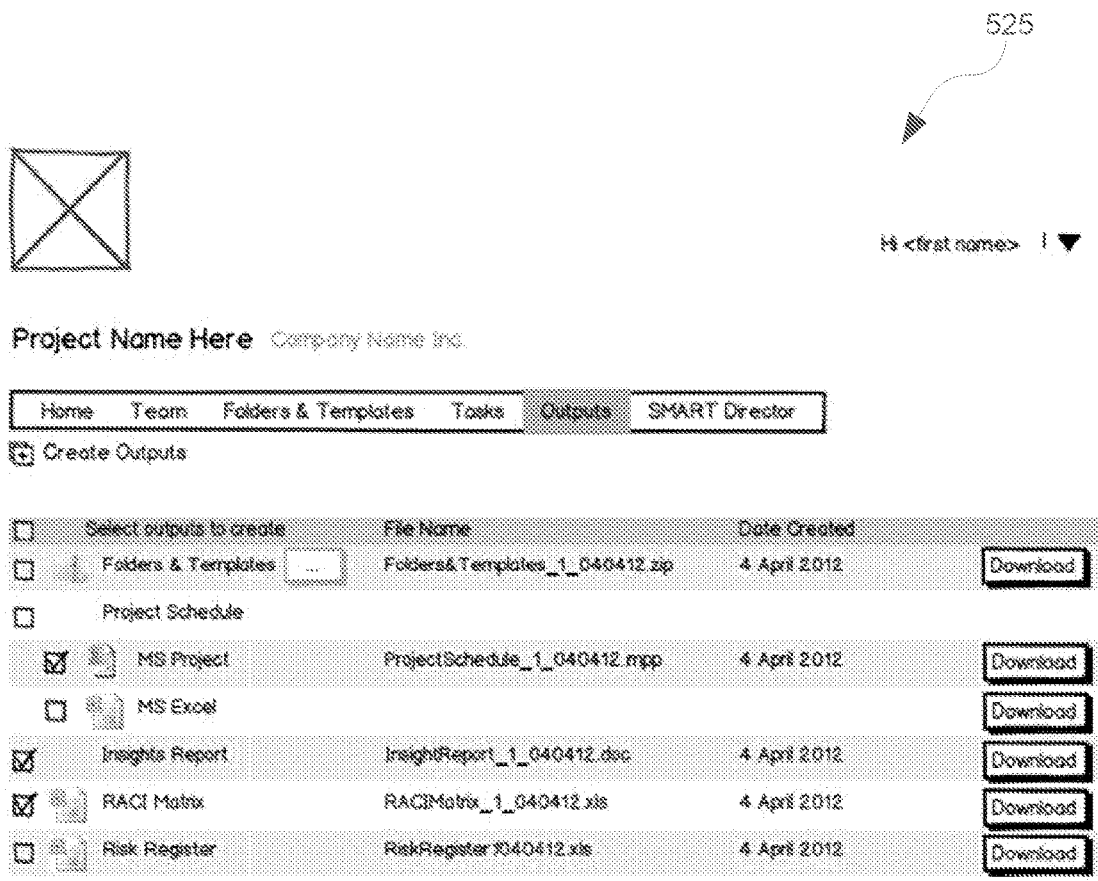

Referring now to the exemplary interface 524 is shown in FIG. 24, there is shown the presentation of an exemplary question. As is apparent, the question in this question screen relates to the type of project or business area the end user will be working on. Two exemplary answers are provided, being software related modules and is development. As is apparent, the answers comprise a tip presenting the end user with more information.

Generate Project Specific Configuration Data from the Project Template Data in Accordance with the Answer Data At step 330 of method 300, the application server 210 is adapted to generate project specific configuration data in accordance with the answer data and the rule data.

Specifically, the application server 210 is adapted to select the appropriate project template data from the database 270 and generate the project specific configuration data in accordance with the project template data, rule data and the answer data received from the end user.

The project specific configuration data creation process will now be described in further detail in relation to the different projects template data types in which the following exemplary steps are provided:

The end user answers questions in a wizard;

At completion of the wizard process the application server 210 applies the rule data to the project template data to select those portions from the project template data relevant to the project to create the project specific configuration data;

In the creation of tasks:
The application server 210 starts with base plan for the type of project or activity selected;
Then the application server 210 determines, by referring to the answer data selected in the wizard process which rules to apply to the tasks;
The application server 210 then includes and excludes tasks as per the rules;
The application server 210 then sets any durations required as a result of an answer to a question;
The application server 210 orders the groups of tasks as per the plan order which is ordered by different project or activity types. For example a plan might have new software, project management and change management plans that combined make one large project plan;
The application server 210 then calculates the appropriate duration of the tasks as per the settings of the system. The application server 210 does a number of top down and bottom up calculations using the start and end date of the project, the duration settings (% or days) and predecessors to calculate the duration of tasks;
If necessary, the application server 210 then alters the end date or start date if possible based on the duration calculations;

For the assignment of responsibility type to each role (RACI):
The application server 210 creates the RACI matrix by first taking the list of tasks as per the above process;
The application server 210 then modifies any text or includes or excludes visible tasks based on rules and settings input into the system (e.g. in the RACI not all tasks are necessarily require to be visible or the wording is slightly changed for the purpose of the RACI);
The application server 210 then applies the appropriate settings for responsible, accountable, consulted, informed based on rules for the questions answered;
The application server 210 then goes back to the tasks and modifies any roles responsible for tasks based on rules applicable to the RACI matrix. (remembering a raci rule can change who is responsible for a task).

For the calculation of Risks:
the application server (as above) uses the answers to the questions to apply any relevant risk rules;
The application server 210 then takes the base list of risks for the project type(s) selected;
the application server 210 then includes or excludes risks based on the rules; and the application server 210 then changes who is responsible for the risk based on the rules.

For the generation of reminders:
the application server 210 selects the relevant reminders based on the tasks that have been included as per the above rules; and
The appropriate reminder date is determined by the application server 210 based on the task dates and is set ready to be presented to the user when appropriate For the creation of folders and templates:
the application server selects the folders based on the project types relevant for the project;
if the admin user has set default settings for folder names and structures those will be used for this project;
the application server 210 includes the templates/documents in the folders based on the tasks included. All templates are linked or related to a task so if that task was not included the template or document is not included either as it is deemed to not be relevant for this specific project;
if the end user has set to use their own folder and template structure the application server 210 uses that setting for this project; and
if the end user has default setting to include any documents or templates not related to a smart template or task, those are also included.

For the creation of project Insights:
The application server 210 creates insights documents based on the type of project, tasks, risks and templates included.

For Milestone tracking:
the application server 210 determines milestones based on the tasks including being adapted to monitor the completion of the milestones.

Having created the project specific configuration data, the application server 210 may be adapted to allow the end user to make modifications to this project specific configuration data. Specifically, the end user may be able to select team members for inclusion on the project and in doing so, link that team member with a particular role such that the application server 210 can assign to the team member any tasks, risks or the like associated with the role.

Selecting a team member will cause the application server 210 to allocate the tasks, risks and responsibility types to the specific team member.

In one embodiment, the application server 210 may be adapted to allow the end user to modify the folder structure for the project. Similarly, the application server 210 may be adapted to allow the end user to modify the default templates and instead use their own templates.

Yet further, the application server may be adapted to allow the end user to modify the responsibility types for each role by amending the RACI matrix.

Figure 26:
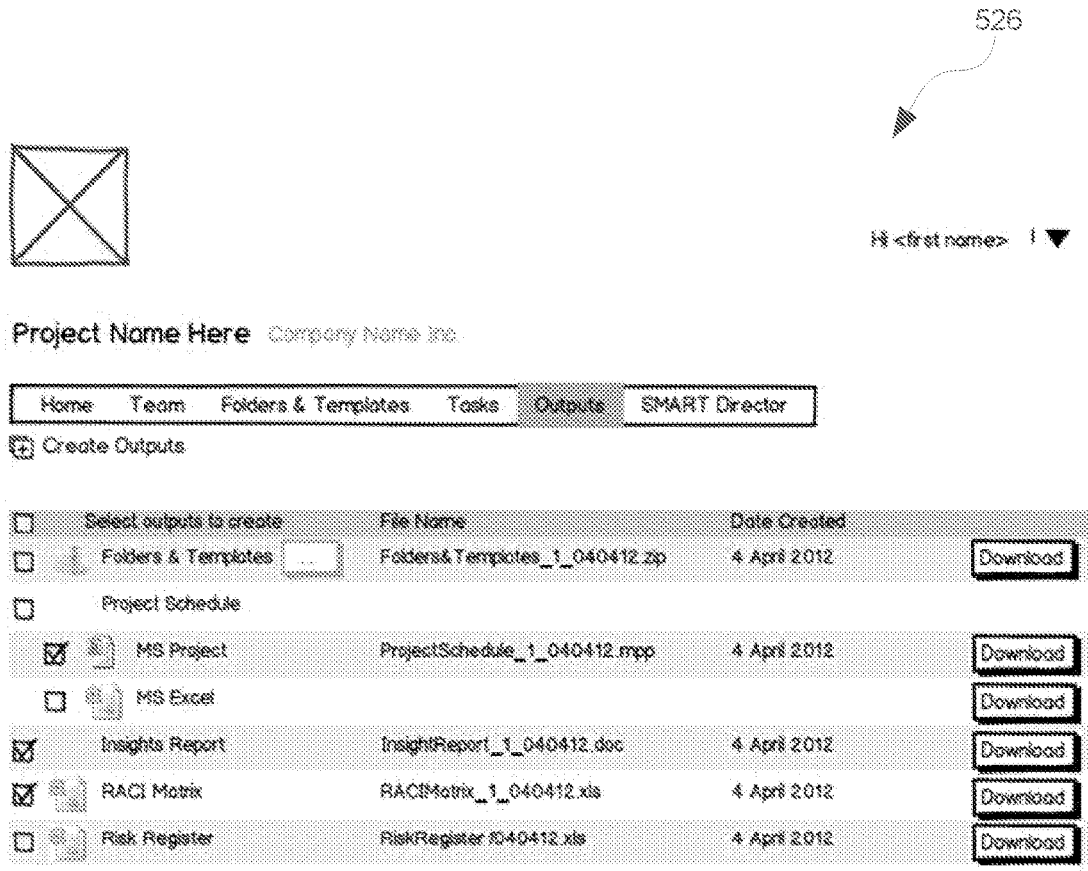

Referring now to the exemplary interface 526 as shown in FIG. 26, there is shown an exemplary project specific configuration data output by the application server 210. As is apparent, each of the project specific configuration data elements may be downloaded for use on a stand-alone computing device. Specifically, the project outputs comprise:

Project Schedule (MS Project or Excel)
Folders and Templates/Documents (full or a lite version for smaller projects)—zip file
Risk Register—excel
Roles and Responsibilities listing—word document
RACI matrix (RACI=Responsible, Accountable, Consulted, Informed)—excel
Project Insights Report which is like a project guide where advice from prior experience can be provided and extra information and direction regarding specific tasks, documents and risks for example—word document
Budget document—is an initial budget document created based on the roles required for the project, the duration of the project and a daily or hourly rate for the people allocated to the project as per the user settings. (excel)
Subject Matter Expert register—(excel)—is a table showing the relevant subject matter experts for the project
Stakeholder identification and analysis start (excel)—is the inclusion of specific insights of stakeholders/roles included in the project to help in commencing the stakeholder analysis piece The end user can then download the project outputs to their own system or computer.

Interpretation

Bus

In the context of this document, the term "bus" and its derivatives, while being described in a preferred embodiment as being a communication bus subsystem for interconnecting various devices including by way of parallel connectivity such as Industry Standard Architecture (ISA), conventional Peripheral Component Interconnect (PCI) and the like or serial connectivity such as PCI Express (PCIe), Serial Advanced Technology Attachment (Serial ATA) and the like, should be construed broadly herein as any system for communicating data.

In Accordance with:

As described herein, 'in accordance with' may also mean 'as a function of' and is not necessarily limited to the integers specified in relation thereto.

Composite Items

As described herein, 'a computer implemented method' should not necessarily be inferred as being performed by a single computing device such that the steps of the method may be performed by more than one cooperating computing devices.

Similarly objects as used herein such as 'web server', 'server', 'client computing device', 'computer readable medium' and the like should not necessarily be construed as being a single object, and may be implemented as a two or more objects in cooperation, such as, for example, a web server being construed as two or more web servers in a server farm cooperating to achieve a desired goal or a computer readable medium being distributed in a composite manner, such as program code being provided on a compact disk activatable by a license key downloadable from a computer network.

Database:

In the context of this document, the term "database" and its derivatives may be used to describe a single database, a set of databases, a system of databases or the like. The system of databases may comprise a set of databases wherein the set of databases may be stored on a single implementation or span across multiple implementations. The term "database" is also not limited to refer to a certain database format rather may refer to any database format. For example, database formats may include MySQL, MySQLi, XML or the like.

Wireless:

The invention may be embodied using devices conforming to other network standards and for other applications, including, for example other WLAN standards and other wireless standards. Applications that can be accommodated include IEEE 802.11 wireless LANs and links, and wireless Ethernet.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. In the context of this document, the term "wired" and its derivatives may be used to describe circuits, devices, systems, methods, techniques, communications channels, etc., that may communicate data through the use of modulated electromagnetic radiation through a solid medium. The term does not imply that the associated devices are coupled by electrically conductive wires.

Processes:

Unless specifically stated otherwise, as apparent from the following discussions, it is appreciated that throughout the specification discussions utilizing terms such as "processing", "computing", "calculating", "determining", "analysing" or the like, refer to the action and/or processes of a computer or computing system, or similar electronic computing device, that manipulate and/or transform data represented as physical, such as electronic, quantities into other data similarly represented as physical quantities.

Processor:

In a similar manner, the term "processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. The processing system further may include a memory subsystem including main RAM and/or a static RAM, and/or ROM.

Computer-Readable Medium:

Furthermore, a computer-readable carrier medium may form, or be included in a computer program product. A computer program product can be stored on a computer usable carrier medium, the computer program product comprising a computer readable program means for causing a processor to perform a method as described herein.

Networked or Multiple Processors:

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Additional Embodiments:

Thus, one embodiment of each of the methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects.

Furthermore, the present invention may take the form of carrier medium (e.g., a computer program product on a computer-readable storage medium) carrying computer-readable program code embodied in the medium.

Carrier Medium:

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media.

Implementation:

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Means for Carrying Out a Method or Function

Furthermore, some of the embodiments are described herein as a method or combination of elements of a method that can be implemented by a processor of a processor device, computer system, or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

Connected

Similarly, it is to be noticed that the term connected, when used in the claims, should not be interpreted as being limitative to direct connections only. Thus, the scope of the expression a device A connected to a device B should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other.

Embodiments:

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

The invention claimed is:

1. An application server for generating project specific configuration data, the application server comprising:
   a processor for processing digital data;
   a memory device for storing digital data including computer program code, the memory device being coupled to the processor;
   a data interface for sending and receiving data across a data network, the data interface being coupled to the processor,
   a database connection for storing and retrieving digital data including a plurality of items of project template data representing at least one project template, wherein the processor is controlled by the computer program code to:
   receive, via the data interface, the project template data;
   store, using the database connection, the project template data;
   receive, via the data interface, question configuration data representing at least one question and at least one associated candidate answer;
   store, using the database connection, the question configuration data;
   receive, via the data interface, rule data representing a rule relating the project template data and the question configuration data;
   store, using the database connection, the rule data;
   send, via the data interface, question data from the question configuration data;
   receive, via the data interface, answer data in response to the question data; and
   generate project specific configuration data from the project template data in accordance with the answer data and the rule data, wherein the rule data maps the answer data to the items of project template data to select items of project template data, wherein the selected items of project template data are added to build the project configuration data.

2. An The application server as claimed in claim 1, wherein the project template data comprises project category data representing at least one project category and wherein the processor is further controlled by the computer program code to store, in the database, the project template data in relation to the project category data.

3. The application server as claimed in claim 2, wherein the at least one project category comprises at least one of module, parent project type, project type and sub type categories.

4. The application server as claimed in claim 1, wherein the project template data comprises project task template data representing at least one project task template and wherein, in generating the project specific configuration data, the processor is further controlled by the computer program code to generate project task data representing at least one project task in accordance with the project task template data.

5. The application server as claimed in claim 4, wherein the project task template data comprises deadline data representing at least one deadline for completion of the at least one project task.

6. The application server as claimed in claim 4, wherein the project task template data comprises role data representing at least one role responsible for completion of the at least one project tasks.

7. The application server as claimed in claim 1, wherein the project template data comprises risk template data representing at least one risk template.

8. The application server as claimed in claim 7, wherein the risk template data comprises responsible role data representing a role responsible for managing a risk.

9. The application server as claimed in claim 1, wherein the project template data comprises role template data representing at least one role, and wherein, in generating project task data, the processor is further controlled by the computer program code to generate responsibility data representing at least one responsibility for the at least one role in accordance with the role template data and the project task template data.

10. The application server as claimed in claim 9, wherein the project template data comprises responsibility type data representing at least one responsibility type and wherein, in generating the responsibility data, the processor is further controlled by the computer program code to assign a type to the at least one responsibility.

11. The application server as claimed in claim 10, wherein the at least one responsibility type comprises at least one of responsible, accountable, consulted and informed types.

12. The application server as claimed in claim 11, wherein the responsibility type data is a matrix.

13. The application server as claimed in claim 1, wherein the project template data comprises filesystem directory structure data representing a directory structure and wherein the processor is further controlled by the computer program code to structure a directory in accordance with the filesystem directory structure data.

14. The application server as claimed in claim 13, wherein the filesystem directory structure data comprises template data representing a template for inclusion in a specified directory and wherein the processor, in generating the project specific configuration data, is further controlled by the computer program code to store, in the specified directory the template data.

15. The application server as claimed in claim 14, wherein the template data comprises file data.

16. The application server as claimed in claim 1, wherein the project template data comprises reminder template data representing at least one reminder and wherein the processor, in generating the project specific configuration data, is further controlled by the computer program code to generate reminder data representing at least one reminder in accordance with the reminder template data.

17. The application server as claimed in claim 1, wherein the processor is further controlled by the computer program code to associate at least one rule with the at least one associated candidate answer.

18. A non-transitory computer readable storage medium for generating project specific configuration data, the computer readable storage medium comprising computer code instructions executable by a computer and comprising instructions for:
receiving, via a data interface, a plurality of items of project template data;
storing, using a database connection, the project template data;
receiving, via the data interface, question configuration data representing at least one question and at least one associated candidate answer;
storing, using the database connection, the question configuration data;
receiving, via the data interface, rule data representing a rule relating the project template data and the question configuration data;
storing, using the database connection, the rule data;
sending, via the data interface, question data from the question configuration data;
receiving, via the data interface, answer data in response to the question data; and
generating project specific configuration data from the project template data in accordance with the answer data and the rule data, wherein the rule data maps the answer data to the items of project template data to select items of project template data, wherein the selected items of project template data are added to build the project configuration data.

19. The non-transitory computer readable storage medium as claimed in claim 18, wherein the project template data comprises project category data representing at least one project category and further comprising instructions for storing, in the database, the project template data in relation to the project category data.

20. The non-transitory computer readable storage medium as claimed in claim 19, wherein the at least one project category comprises at least one of module, parent project type, project type and sub type categories.

21. The non-transitory computer readable storage medium as claimed in claim 18, wherein the project template data comprises project task template data representing at least one project task template and further comprising instructions for generating project task data representing at least one project task in accordance with the project task template data.

22. The non-transitory computer readable storage medium as claimed in claim 21, wherein the project task template data comprises deadline data representing at least one deadline for the completion of the at least one project task.

23. The non-transitory computer readable storage medium as claimed in claim 21, wherein the project task template data comprises role data representing at least one role responsible for the completion of the at least one project tasks.

24. The non-transitory computer readable storage medium as claimed in claim 18, wherein the project template data comprises risk template data representing at least one risk template.

25. The non-transitory computer readable storage medium as claimed in claim 24, wherein the risk template data comprises responsible role data representing a role responsible for managing a risk.

26. The non-transitory computer readable storage medium as claimed in claim 21, wherein the project template data comprises role template data representing at least one role, and further comprising instructions for generating responsibility data representing at least one responsibility for the at least one role in accordance with the role template data and the project task template data.

27. The non-transitory computer readable storage medium as claimed in claim 26, wherein the project template data comprises responsibility type data representing at least one responsibility type and further comprising instructions for assigning a type to the at least one responsibility.

28. The non-transitory computer readable storage medium as claimed in claim 27, wherein the at least one responsibility type comprises at least one of responsible, accountable, consulted and informed types.

29. The non-transitory computer readable storage medium as claimed in claim 28, wherein the responsibility type data is a matrix.

30. The non-transitory computer readable storage medium as claimed in claim 18, wherein the project template data comprises filesystem directory structure data representing a directory structure and further comprising instructions for structuring a directory in accordance with the filesystem directory structure data.

31. The non-transitory computer readable storage medium as claimed in claim 30, wherein the filesystem directory structure data comprises template data representing a template for inclusion in a specified directory and further comprising instructions for storing, in the specified directory the template data.

32. The non-transitory computer readable storage medium as claimed in claim 31, wherein the template data comprises file data.

33. The non-transitory computer readable storage medium as claimed in claim 18, wherein the project template data comprises reminder template data representing at least one reminder and further comprising instructions for generating reminded data representing at least one reminder in accordance with the reminder template data.

34. The non-transitory computer readable storage medium as claimed in claim 18, further comprising instructions for associating at least one rule with the at least one associated candidate answer.

* * * * *

UNITED STATES PATENT AND TRADEMARK OFFICE
CERTIFICATE OF CORRECTION

PATENT NO.        : 9,703,548 B2
APPLICATION NO.   : 14/648523
DATED             : July 11, 2017
INVENTOR(S)       : Louise Ledbrook et al.

It is certified that error appears in the above-identified patent and that said Letters Patent is hereby corrected as shown below:

Column 19 Line 62, Claim 2:
Before "The"
Delete "An"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*